(12) United States Patent
Furuya et al.

(10) Patent No.: US 7,618,555 B2
(45) Date of Patent: Nov. 17, 2009

(54) INK COMPOSITION CONTAINING RED LUMINOUS MATERIAL

(75) Inventors: Fumio Furuya, Neyagawa (JP); Yasuhiro Yamasaki, Neyagawa (JP)

(73) Assignee: Orient Chemical Industries, Ltd., Osaka-shi (JP)

( * ) Notice: Subject to any disclaimer, the term of this patent is extended or adjusted under 35 U.S.C. 154(b) by 252 days.

(21) Appl. No.: 11/783,197

(22) Filed: Apr. 6, 2007

(65) Prior Publication Data

US 2008/0245267 A1    Oct. 9, 2008

(30) Foreign Application Priority Data

Apr. 6, 2006    (JP) .............................. 2006-105421

(51) Int. Cl.
*C09D 11/00* (2006.01)
*C09K 11/06* (2006.01)

(52) U.S. Cl. .................. 252/301.16; 534/16; 106/31.64; 106/31.15; 106/31.32; 428/690; 252/301.34; 252/301.36

(58) Field of Classification Search ............. 252/301.16; 534/16; 106/31.64, 31.15, 31.32; 428/690
See application file for complete search history.

(56) References Cited

U.S. PATENT DOCUMENTS

| | | | |
|---|---|---|---|
| 6,846,350 B2 * | 1/2005 | Imanishi et al. | 106/31.14 |
| 2003/0102800 A1 * | 6/2003 | Kuo et al. | 313/504 |
| 2003/0106460 A1 | 6/2003 | Imanishi et al. | |
| 2003/0110979 A1 | 6/2003 | Imanishi et al. | |
| 2005/0119368 A1 | 6/2005 | Hall-Goulle et al. | |

FOREIGN PATENT DOCUMENTS

| JP | 54-22336 B2 | 8/1979 |
|---|---|---|
| JP | 64-006085 A | 1/1989 |
| JP | 64-026583 A | 1/1989 |
| JP | 03-050291 A | 3/1991 |
| JP | 6-15269 B2 | 3/1994 |
| JP | 2000-144029 A | 5/2000 |
| JP | 2000-160083 A | 6/2000 |
| JP | 2003-026969 A | 1/2003 |
| JP | 2003-129045 A | 5/2003 |
| JP | 2005-041941 A | 2/2005 |
| JP | 2005-518472 A | 6/2005 |

OTHER PUBLICATIONS translation for JP 2005-41941.*

* cited by examiner

*Primary Examiner*—C. Melissa Koslow
(74) *Attorney, Agent, or Firm*—Birch, Stewart, Kolasch & Birch, LLP

(57) ABSTRACT

The present invention relates to an red luminescent ink composition exhibiting adequate and stable emission intensity under irradiation of ultraviolet rays and high solubility for a resin and an organic solvent. The ink composition of the present invention contains a luminous compound represented by the following formula (1):

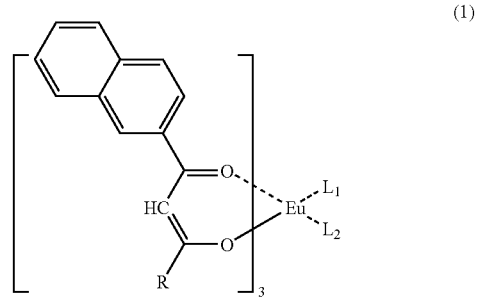

wherein R is a perfluoroalkyl group having 2 to 20 carbons, $L_1$ and $L_2$ are the same or different and are sulfoxide having a substituted or unsubstituted aryl group or a substituted or unsubstituted an alkyl group.

5 Claims, 17 Drawing Sheets

INK COMPOSITION CONTAINING RED LUMINOUS MATERIAL

FIELD OF THE INVENTION

The present invention relates to an ink composition provided for preparing various inks for printing used for security use provided for preventing forgery and a luminescent element comprising a luminous material in the EL and LED fields because the ink composition is colorless.

BACKGROUND OF THE INVENTION

In recent years, the term "functional organic compound" has come and studies for using organic substances in electrical or optical devices have been actively pursued. Among such substances, luminous compounds (self-luminous compounds) having photo luminescence (PL) phenomenon are known.

An example of application of the luminous compounds is security ink. The security ink means an ink that its handwriting is invisible under visible light, but when being irradiated with ultraviolet rays, e.g. black light lamp, the handwriting emits light and one can read information recorded.

The security ink is used for the purpose of preventing forgery or reproduction or of recording secret information for purpose of confidentiality. For example, if the lot numbers, codes and the like of commercial goods are recorded with a security ink, it comes easy to trace the distribution channels of the commercial goods or to prevent the production or distribution of the forgery, and the fear of manipulation or damage of recorded information is reduced because the information is invisible under visible light.

The Patent Literature 1 (JP-A-2000-144029) discloses an ink composition with the following feature; being substantially invisible within the visible light region; containing a dye containing europium (Eu) complex having an emission center wavelength at 615±20 nm when being excited with ultraviolet rays and a polyvinyl resin; containing as a neutral ligand, at least a phosphonic acid type compound selected from a phosphine oxide compound, a phosphine sulfide compound and a phosphine compound; and containing not less than 94% of water and/or ethanol in a solvent.

The Patent Literature 2 (JP-A-2000-160083) discloses an ink composition for ink jet printing containing, as a luminous material, from 0.001 to 5% by weight of 4,4,4-trifluoro-1-(2-thienyl)-1,3-butanedionate europium chelate compound and also containing not less than 70% by weight of an alcoholic solvent as a solvent. Further, the Patent Literature 3 (JP-A-2003-26969) discloses an ink composition in which an europium compound represented by

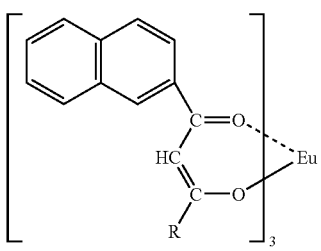

is contained as a luminous material.

Further, with respect to an ink composition using the luminous material of europium complex, an aqueous ink for jet printing that becomes visible when being irradiated with ultraviolet rays (the Patent Literature 4, JP-B-Sho 54 (1979)-22336), a fluorescent europium complex for thermal transfer (the Patent Literature 5, JP-B-Hei 6(1994)-15269), a luminous ink composition containing an europium complex in which a bidentate ligand, e.g., bipyridine derivative or phenanthroline derivative, coordinates to europium (the Patent Literature 6, JP-A-Hei 3(1991)-50291), an ink composition which contains a tetra(benzoyl trifluoroacetonate) europium complex having an ammonium salt as a counter ion (the Patent Literatures 7, JP-A-Sho 64(1989)-6085 and 8, JP-A-Sho 64(1989)-26583) and the like are known as ink composition. On the other hand, the Patent Literature 9 Japanese Patent Kohyo 2005-518472 discloses the ink composition of europium complex having a trifluoromethyl group in the substituent of diketone being a ligand and in which the second ligand is sulfoxide. The Non-patent Literature 1, Mol. Phys. 101, 1037(2003) and the Patent Literature 10, JP-A-2005-41941, disclose a europium complex having a trifluoromethyl group at the substituent of diketone and its second ligand being sulfoxide, and its application of EL and LED. Further, the Patent Literature 11, JP-A-2003-129045 discloses a trisdiketonate europium complex having sulfoxide as the second ligand.

In considering practical use as a security ink, a handwriting or security information recorded with the ink is required to emit to a degree such that the ink is clearly visible when being irradiated with ultraviolet rays, e.g., a black light lamp (365 nm). However, the conventional luminous compounds or ink compositions is unsatisfactory in emission intensity or have a problem in stability when the ink contains alcohol as a solvent.

Therefore, there is a demand for providing a red luminous ink composition that exhibits excellent emission intensity such that a handwriting or image recorded which is substantially invisible within the visible light region can be visually recognized clearly.

SUMMARY OF THE INVENTION

The present invention intends to solve the above-mentioned conventional problems about the emission intensity, the dissolution stability of ink and the fastness of security information. It is the object of the present invention to provide a red luminous ink composition that is substantially colorless under visible light, but has absorption within a wavelength in the ultraviolet region, and when being excited by ultraviolet light, generates intense emission at wavelength near a red color (600 to 635 nm).

It is reported in Anal. Sci. 12, 31(1996) that the luminance of a luminous material is improved by introducing a perfluoroalkyl group in the substituent of diketone. However, this is a report for a material having phosphoric acid as the second ligand and it has not been confirmed that even a material having sulfoxide as the second ligand has similar effects.

The present invention has been completed by studying trisdiketonato europium complex having sulfoxide as the second ligand, which is introduced a perfluoroalkyl group in the substituent of diketone. It has been cleared that it has great effect for the improvement of emission luminance, solubility and stability and in particular, it has been cleared that when the carbon number of the perfluoroalkyl group is 2 or more, it has greater effect than the carbon number of 1.

Namely, the present invention provides an ink composition comprising a luminous compound represented by the following formula (1):

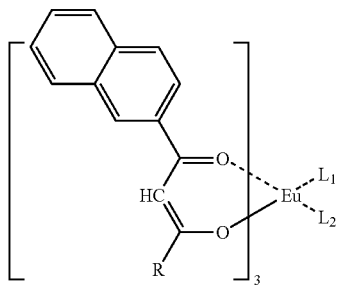

(1)

wherein R is a perfluoroalkyl group having 2 to 20 carbons, $L_1$ and $L_2$ are the same or different and are sulfoxide having a substituted or unsubstituted aryl group or a substituted or unsubstituted an alkyl group, and the above-mentioned purposes are attained thereby.

In order to more preferably carry out the present invention,

R in the above-mentioned formula (1) may preferably be a linear perfluoroalkyl group having 2 to 10 carbons;

$L_1$ and $L_2$ in the above-mentioned formula (1) may preferably be sulfoxide having a linear or branched alkyl group or phenyl group having 1 to 10 carbons;

the ink composition comprising the above-mentioned luminous compound may preferably be obtainable by a reaction of the following components, the first ligand indicated by the under-mentioned formula (2);

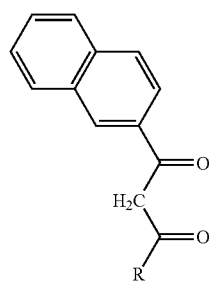

(2)

wherein R is a perfluoroalkyl group having 2 to 20 carbons, the second ligand indicated by $L_1$ or $L_2$, and a trivalent europium compound; and the ink composition comprising the above-mentioned luminous compound may preferably be produced by two steps of synthesizing an europium complex indicated by the formula (3);

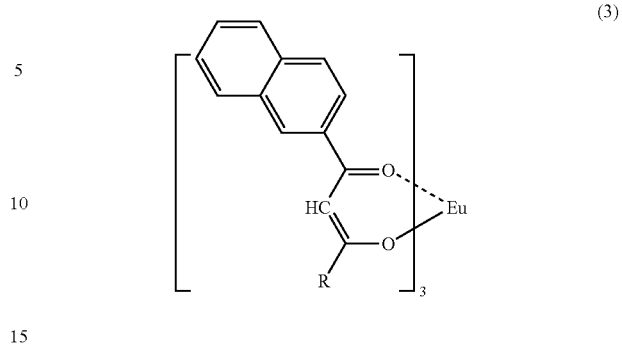

(3)

wherein R is a perfluoroalkyl group having 2 to 20 carbons from the first ligand indicated by the formula (2) and a trivalent europium compound, and reacting the europium complex with the second ligand indicated by $L_1$ or $L_2$.

The present invention can provide an ink composition that is substantially invisible under visible light, shows strong luminescent color at a red region under ultraviolet rays, accordingly useful for fields such as documents in an office, the marking of various containers, the blind printing of bar code and the like and publications having security function, and is superior in solubility, emission luminance and the stability of the ink.

BRIEF DESCRIPTION OF THE DRAWINGS

FIGS. 8a-1 to 8a-4 show the following:

FIG. 8a-1 showing compound data A, G and H (luminous compounds 1, 7 and 8)

FIG. 8a-2 showing compound data B, D and J (luminous compounds 2, 4 and 10)

FIG. 8a-3 showing compound data A, E and I (luminous compounds 1, 5 and 9)

FIG. 8a-4 showing compound data C and F (luminous compounds 3 and 6).

FIGS. 8b-1 to 8b-4 show the following:

FIG. 8b-1 showing compound data A, G and H (luminous compounds 1, 7 and 8)

FIG. 8b-2 showing compound data B, D and J (luminous compounds 2, 4 and 10) FIG. 8b-3 showing compound data A, E and I (luminous compounds 1, 5 and 9) FIG. 8b-4 showing compound data C and F (luminous compounds 3 and 6).

DETAILED DESCRIPTION OF THE INVENTION

Figure 1A:
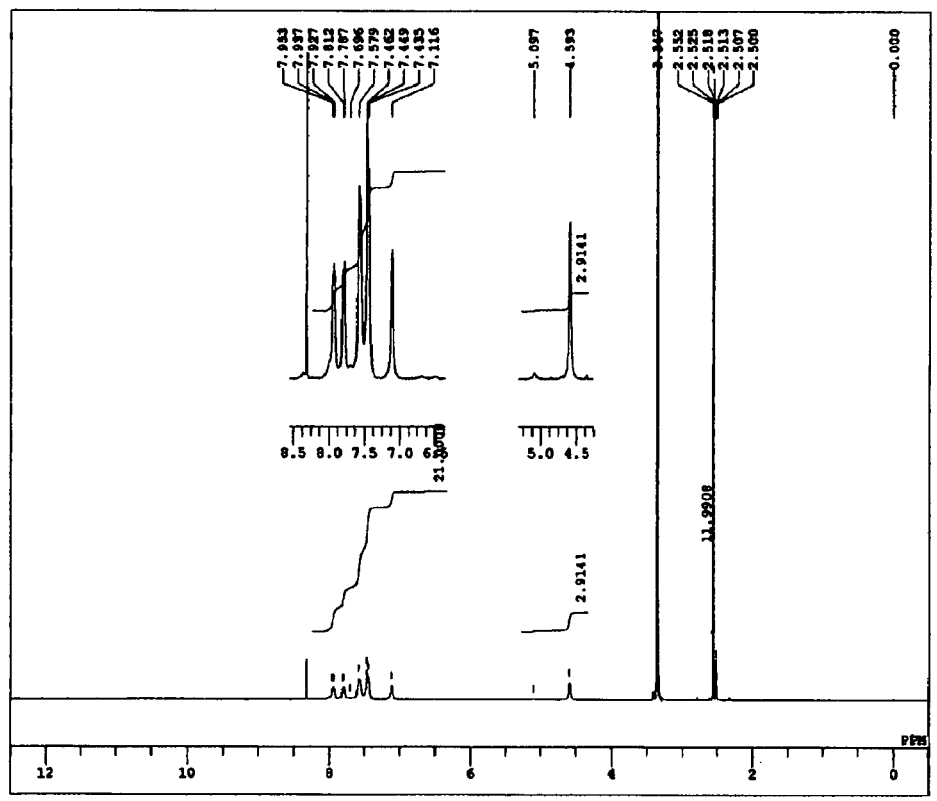
FIG. 1a is the $^1$H-NMR spectrum (1a) of the luminous compound 1-a used in Example.
Figure 1B:
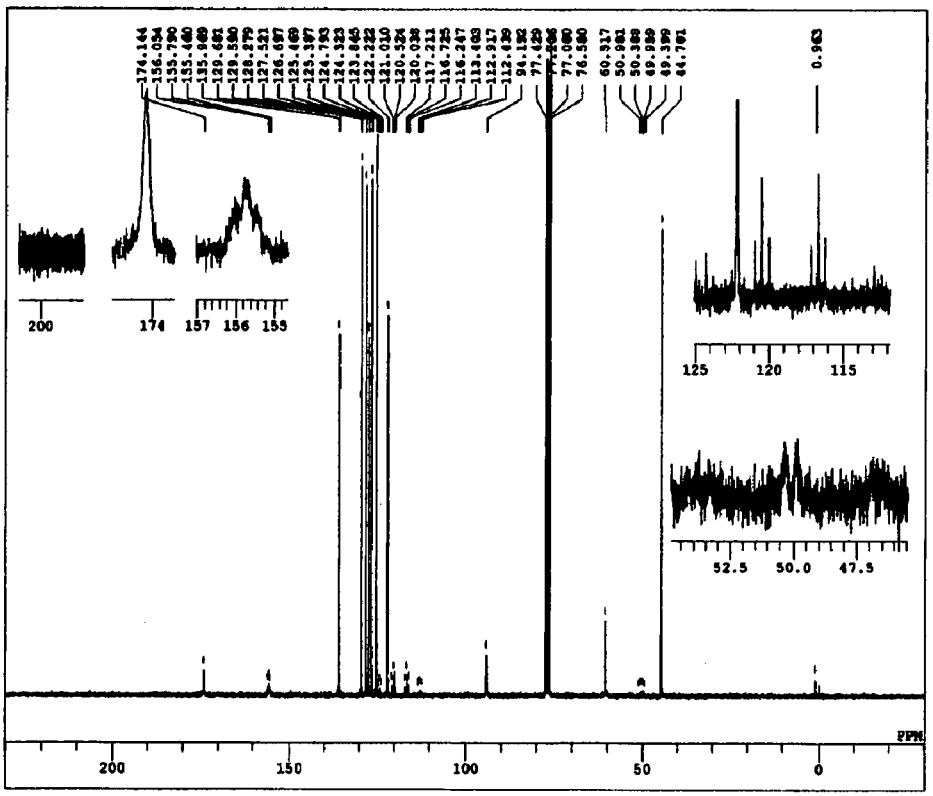
FIG. 1b is the $^{13}$C-NMR spectrum (1b) of the luminous compound 1-a used in Example.
Figure 2A:
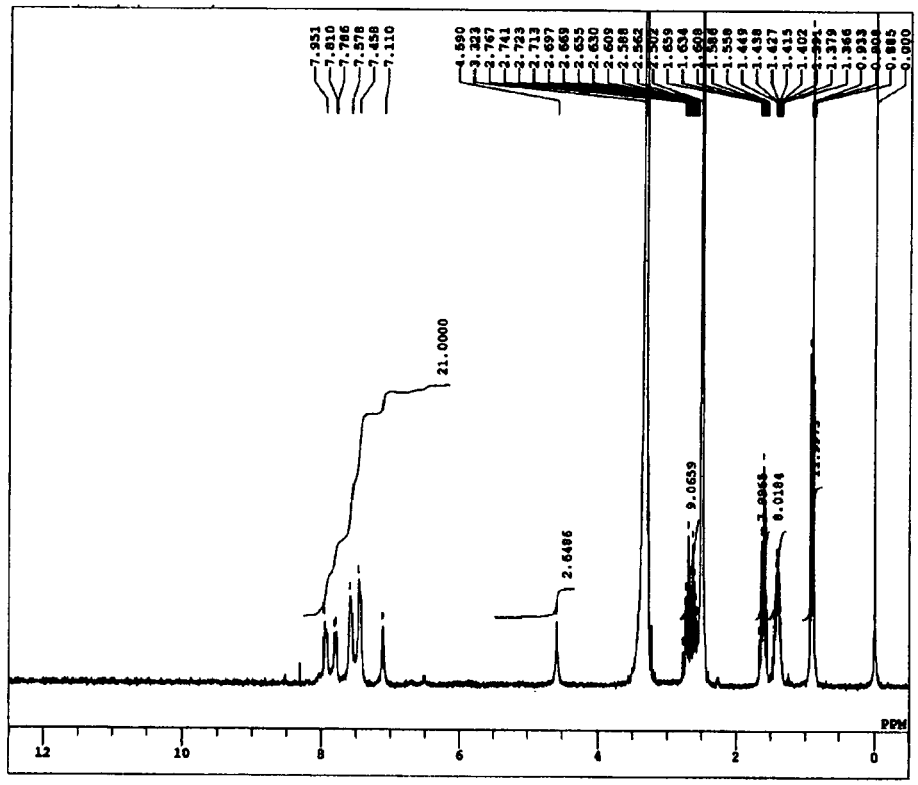
FIG. 2a is the $^1$H-NMR spectrum (2a) of the luminous compound 2 used in Example.
Figure 2B:
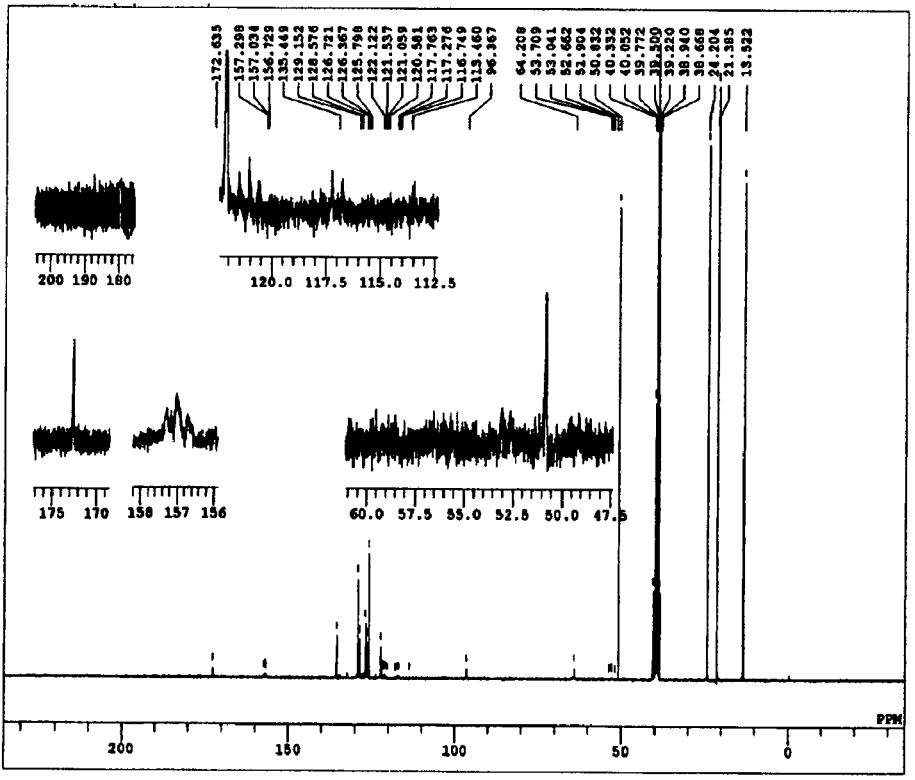
FIG. 2b is the $^{13}$C-NMR spectrum (2b) of the luminous compound 2 used in Example.
Figure 3A:
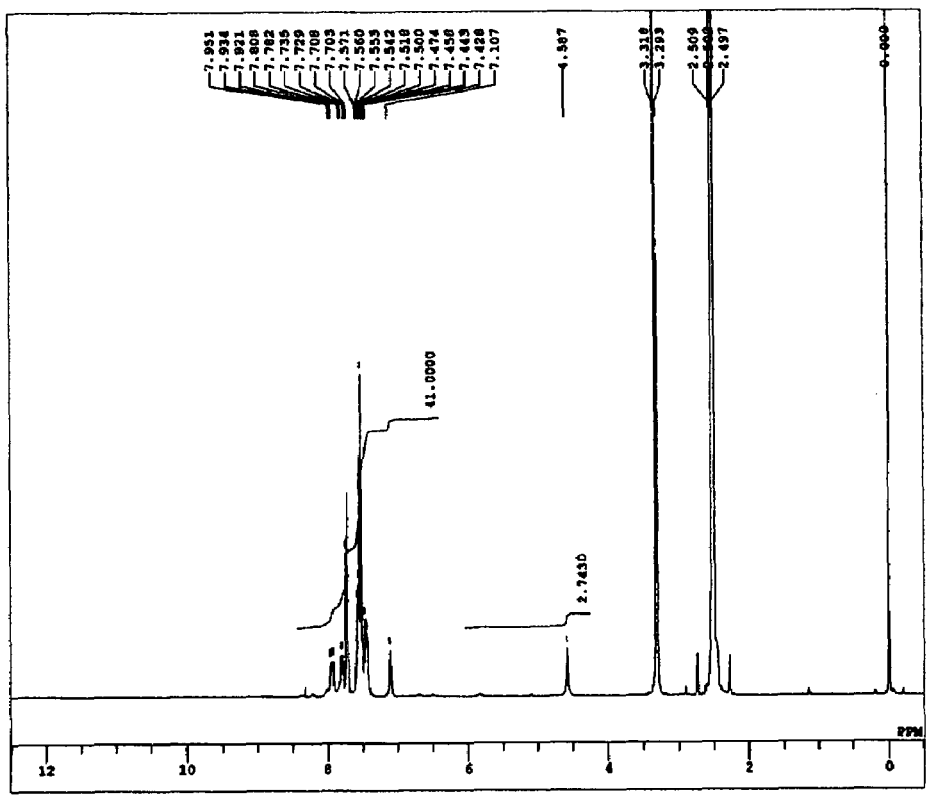
FIG. 3a is the $^1$H-NMR spectrum (3a) of the luminous compound 3 used in Example.
Figure 3B:
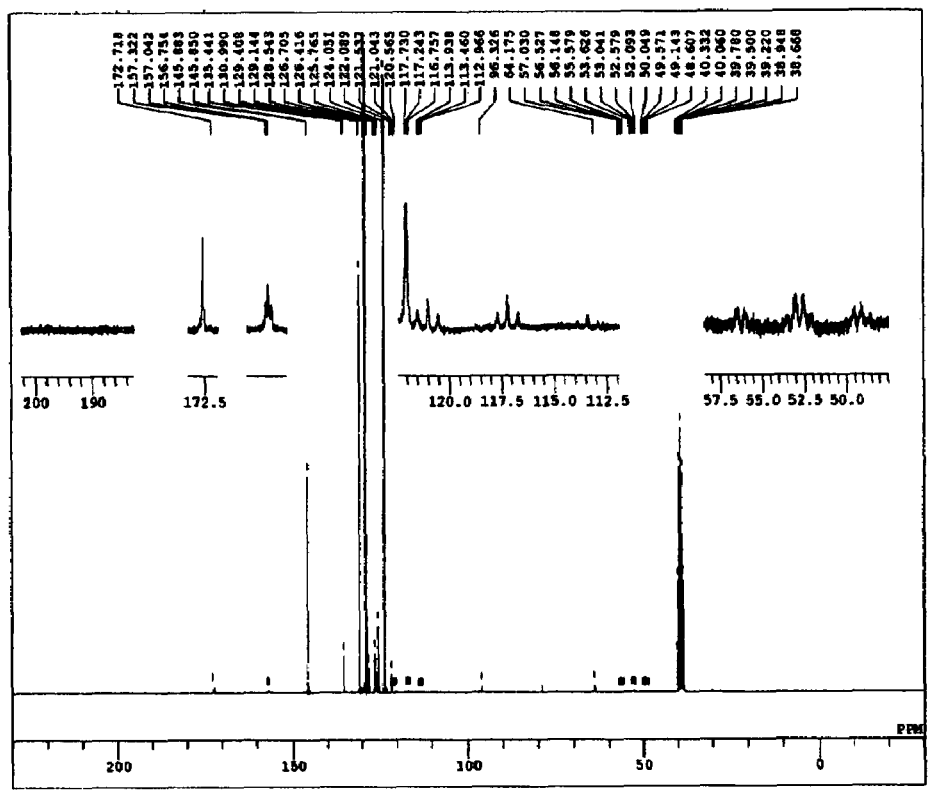
FIG. 3b is the $^{13}$C-NMR spectrum (3b) of the luminous compound 3 used in Example.
Figure 4A:
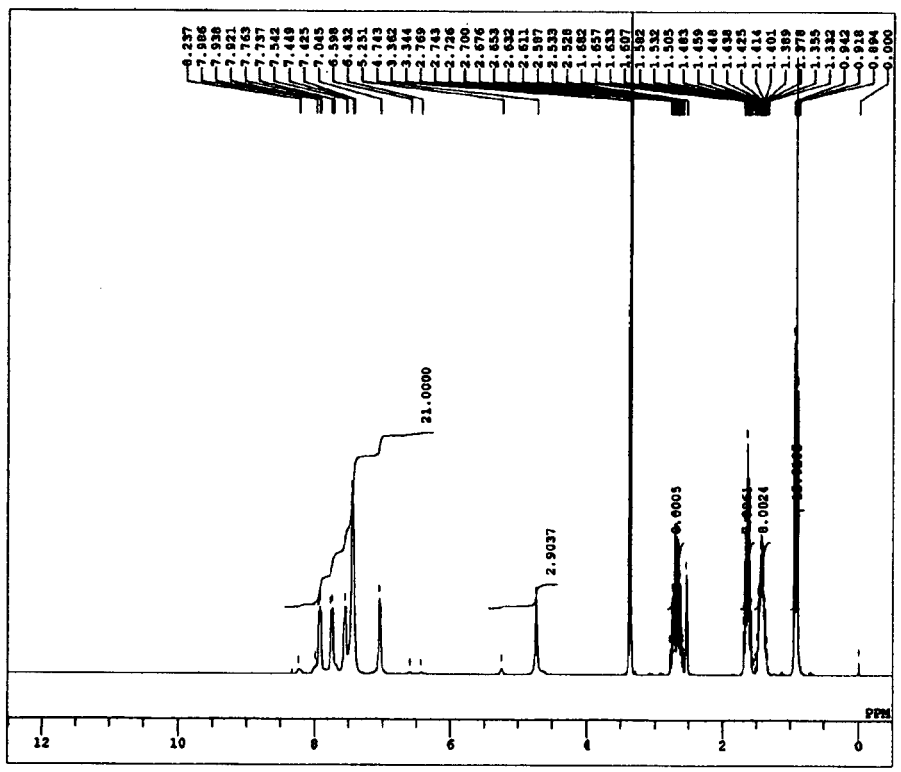
FIG. 4a is the $^1$H-NMR spectrum (4a) of the luminous compound 4 used in Example.
Figure 4B:
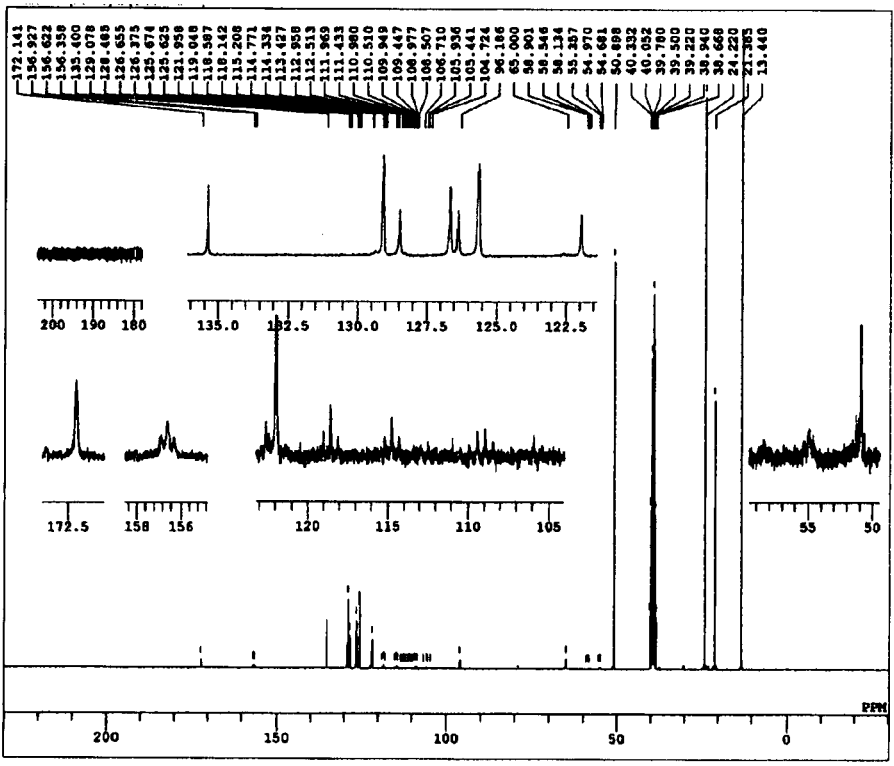
FIG. 4b is the $^{13}$C-NMR spectrum (4b) of the luminous compound 4 used in Example.

The present invention relates to an ink composition emitting red light by ultraviolet rays. The luminous compound represented by the following formula (1) in the ink composition

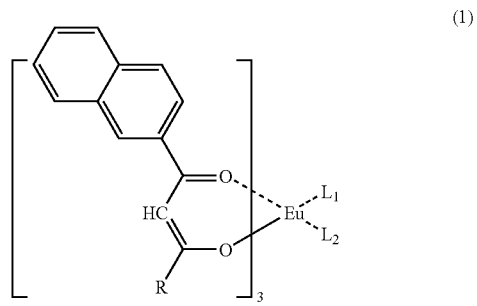

(1)

is an ultraviolet rays-exciting-europium complex in which 3 molecules of specific β-diketone derivatives bonded with a 2-naphthyl group and 2 molecules of sulfoxide coordinate on trivalent europium (rare earth metal).

R in the formula (1) is a perfluoroalkyl group having 2 to 20 carbons and more specifically, can exemplify $C_2F_5$ group, n-$C_3F_7$ group, i-$C_3F_7$ group, n-$C_4F_9$ group, i-$C_4F_9$ group, sec-$C_4F_9$ group, n-$C_5F_{11}$ group, neo-$C_5F_{11}$ group, n-$C_6F_{13}$ group, n-$C_7F_{15}$ group, n-$C_8F_{17}$ group, 2-$C_8F_{17}$ group, n-$C_9F_{19}$ group, n-$C_{10}F_{21}$ group, n-$C_{12}F_{25}$ group, n-$C_{18}F_{37}$ group and the like. Among these, a linear perfluoroalkyl group having 2 to 10 carbons may be preferable.

Further, $L_1$ and $L_2$ in the formula (1) are the same or different and each of substituents is sulfoxide having a substituted or unsubstituted aryl group or a substituted or unsubstituted an alkyl group. The example of the aryl group includes phenyl group, naphthyl group, anthranyl group and the like. The example of the alkyl group includes methyl group, ethyl group, n-propyl group, i-propyl group, n-butyl group, i-butyl group, sec-butyl group, n-pentyl group, neopentyl group, n-hexyl group, n-heptyl group, n-octyl group, 2-ethylhexyl group, n-decyl group, lauryl group, stearyl group and the like. The substituent that the aryl group or alkyl group has includes halogen groups such as F, Cl, Br and I; nitro group; cyano group; lower alkyl groups such as methyl group, ethyl group, propyl group and butyl group; lower alkoxy groups such as methoxy group, ethoxy group, propoxy group and butoxy group; aryl groups such as phenyl group and naphthyl group; aralkyl groups such as benzyl group, α,α-dimethylbenzyl group and phenethyl group and the like.

Specifically, dimethyl sulfoxide, diethyl sulfoxide, dibutyl sulfoxide, dioctyl sulfoxide, diphenyl sulfoxide, bis(1-chlorophenyl) sulfoxide, ditolyl sulfoxide, bis(3-methoxyphenyl) sulfoxide, methylethyl sulfoxide, methylbutyl sulfoxide, ethylbutyl sulfoxide, methyloctyl sulfoxide, butyloctyl sulfoxide, methylphenyl sulfoxide, ethylphenyl sulfoxide and the like can be mentioned.

The luminous compound (1) that the ink composition of the present invention contains can be produced by reaction of the following components:

a β-diketone derivative represented by the formula (2);

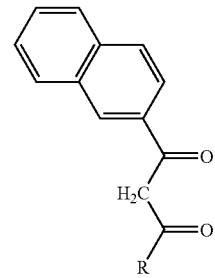

(2)

sulfoxide having a substituted or unsubstituted aryl group or a substituted or unsubstituted an alkyl group that is represented by $L_1$ and $L_2$, and a trivalent europium chloride.

R in the formula (2) is a perfluoroalkyl group having 2 to 20 carbons and more specifically, can exemplify $C_2F_5$ group, n-$C_3F_7$ group, i-$C_3F_7$ group, n-$C_4F_9$ group, i-$C_4F_9$ group, sec-$C_4F_9$ group, n-$C_5F_{11}$ group, neo-$C_5F_{11}$ group, n-$C_6F_{13}$ group, n-$C_7F_{15}$ group, n-$C_8F_{17}$ group, n-$C_{10}F_{21}$ group, n-$C_{12}F_{25}$ group, n-$C_{18}F_{37}$ group and the like. Among these, a perfluoroalkyl group having 2 to 10 carbons may be preferable.

Examples of suitable β-diketone derivative represented by the formula (2) used in the present invention are shown.

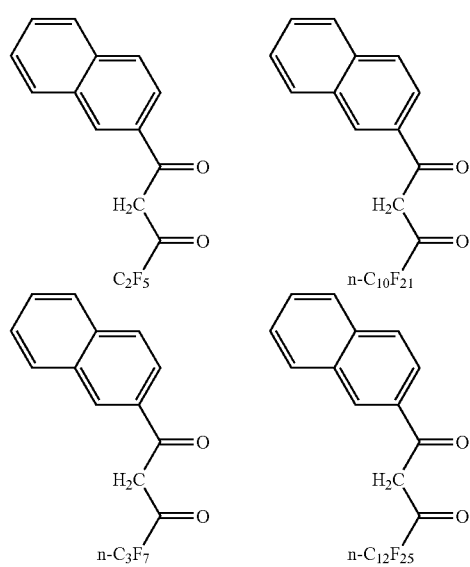

-continued

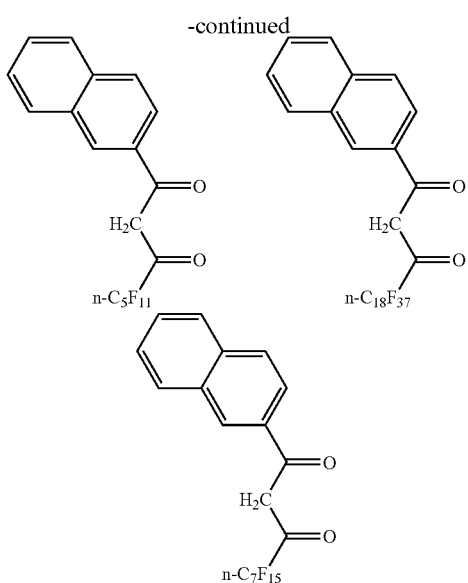

The production process is more specifically indicated. Firstly, as the first stage, the europium complex represented by the formula (3);

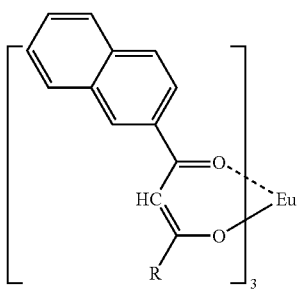

(3)

is obtained by heat-mixing the β-diketone derivative represented by the formula (2), trivalent europium chloride and 1N aqueous NaOH, preferably at a ratio of 3 mol, 1 mol and 3 mol respectively, in a temperature ranging from room temperature to 60° C., for 10 minutes to 5 hours, preferably 0.5 hour to 2 hours, in a solvent such as ketone solvents such as acetone, methyl ethyl ketone, cyclohexanone and 4-methoxy-4-methylpentanone; alcohol solvents such as methanol, ethanol, propanol and isopropanol; polyols such as ethylene glycol, diethylene glycol, propylene glycol, glycerin, dipropylene glycol, 1,2-hexanediol and 2,4,6-hexanetriol; ether solvents such as dioxane, methylcellosolve, ethylcellosolve, butylcellosolve, diethylene glycol monobutyl ether, ethylene glycol monobutyl ether and ethylene glycol monoethyl ether; organic solvents such as dimethylsulfoxide, N-methyl-2-pyrrolidone and γ-butyllactone; preferably a solvent capable of being mixed with a little amount of water such as acetone, ethanol, ethylene glycol and the like.

R in the formula (3) is a perfluoroalkyl group having 2 to 20 carbons and more specifically, can exemplify $C_2F_5$ group, n-$C_3F_7$ group, i-$C_3F_7$ group, n-$C_4F_9$ group, i-$C_4F_9$ group, sec-$C_4F_9$ group, n-$C_5F_{11}$ group, neo-$C_5F_{11}$ group, n-$C_6F_{13}$ group, n-$C_7F_{15}$ group, n-$C_8F_{17}$ group, n-$C_{10}F_{21}$ group, n-$C_{12}F_{25}$ group, n-$C_{18}F_{37}$ group and the like. Among these, a linear perfluoroalkyl group having 2 to 10 carbons may be preferable.

Examples of suitable europium complex represented by the formula (3) used in the present invention are shown below.

Europium Complex 1

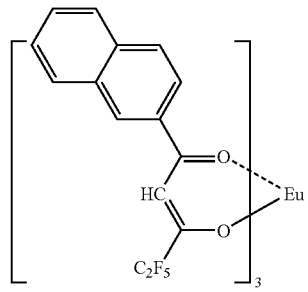

Europium Complex 2

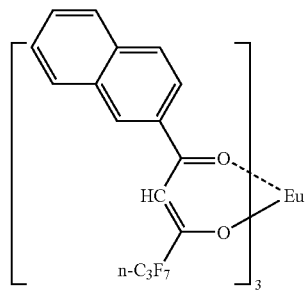

Europium Complex 3

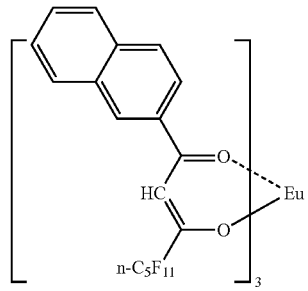

Europium Complex 4

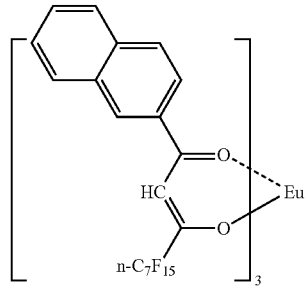

-continued

Europium Complex 5

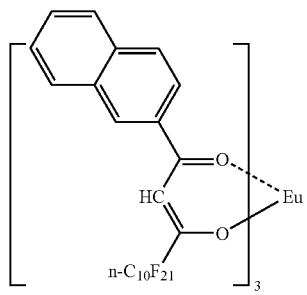

Europium Complex 6

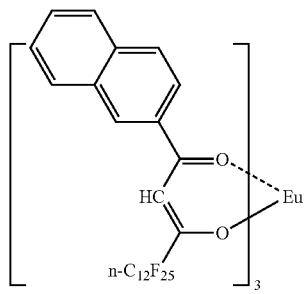

Europium Complex 7

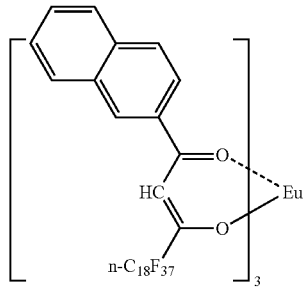

Then, the luminous compound (1) that the ink composition of the present invention contains is obtained by heat-mixing the europium complex represented by the formula (3) and sulfoxide having a substituted or unsubstituted aryl group or a substituted or unsubstituted an alkyl group that is represented by the above-mentioned $L_1$ or $L_2$, preferably at a ratio of 1 mol and 2 mol respectively, in a temperature ranging from room temperature to the boiling point of a solvent under homogeneous mix state, preferably at 20 to 50° C., for 10 minutes to 5 hours, preferably 0.5 hour to 2 hours, in a solvent such as hydrocarbons such as cyclohexane, methylcyclohexane, n-pentane, n-hexane and n-heptane; halogenated hydrocarbon solvents such as dichloromethane and chloroform; ketone solvents such as acetone, methyl ethyl ketone, cyclohexanone and 4-methoxy-4-methylpentanone; organic solvents such as sulfoxide solvent indicated by $L_1$ or $L_2$; and preferably an organic solvent such as dichloromethane, chloroform and DMSO.

Further, the process below is another production process of the luminous compound (1). The europium complex represented by the formula (1) is obtained by heat-mixing the β-diketone derivative, sulfoxide having a substituted or unsubstituted aryl group or a substituted or unsubstituted an alkyl group that is represented by the above-mentioned $L_1$ or $L_2$, trivalent europium chloride and 1N aqueous NaOH, preferably at a ratio of 3 mol, 2 mol, 1 mol and 3 mol respectively, in a temperature ranging from room temperature to 60° C., for 10 minutes to 5 hours and preferably 0.5 hour to 2 hours, in a solvent such as ketone solvents such as acetone, methyl ethyl ketone, cyclohexanone and 4-methoxy-4-methylpentanone; alcohol solvents such as methanol, ethanol, propanol and isopropanol; polyols such as ethylene glycol, diethylene glycol, propylene glycol, glycerin, dipropylene glycol, 1,2-hexanediol and 2,4,6-hexanetriol; ether solvents such as dioxane, methylcellosolve, ethylcellosolve, butylcellosolve, diethylene glycol monobutyl ether, ethylene glycol monobutyl ether and ethylene glycol monoethyl ether; organic solvents such as dimethylsulfoxide, N-methyl-2-pyrrolidone and y-butyllactone; and preferably a solvent capable of being mixed with a little amount of water such as acetone, dimethylsulfoxide, ethylene glycol and the like.

Example of suitable luminous compound (1) that the ink composition of the present invention contains is shown below.

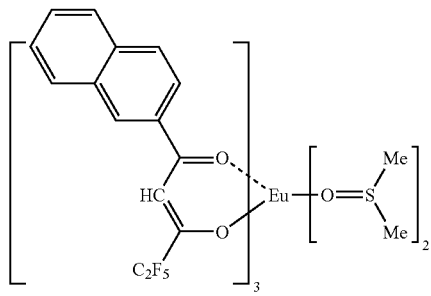

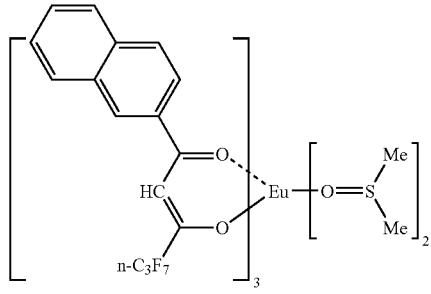

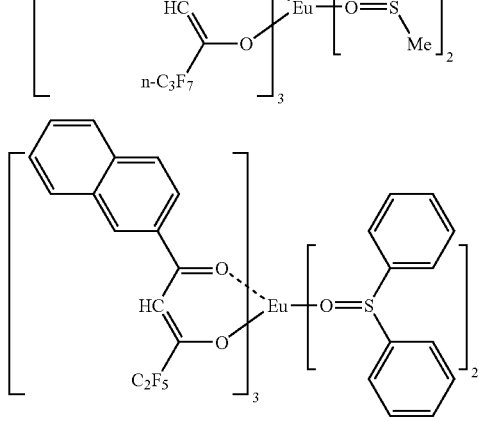

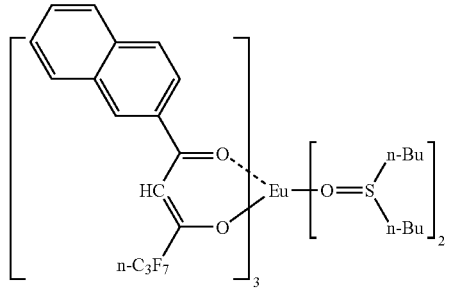

-continued
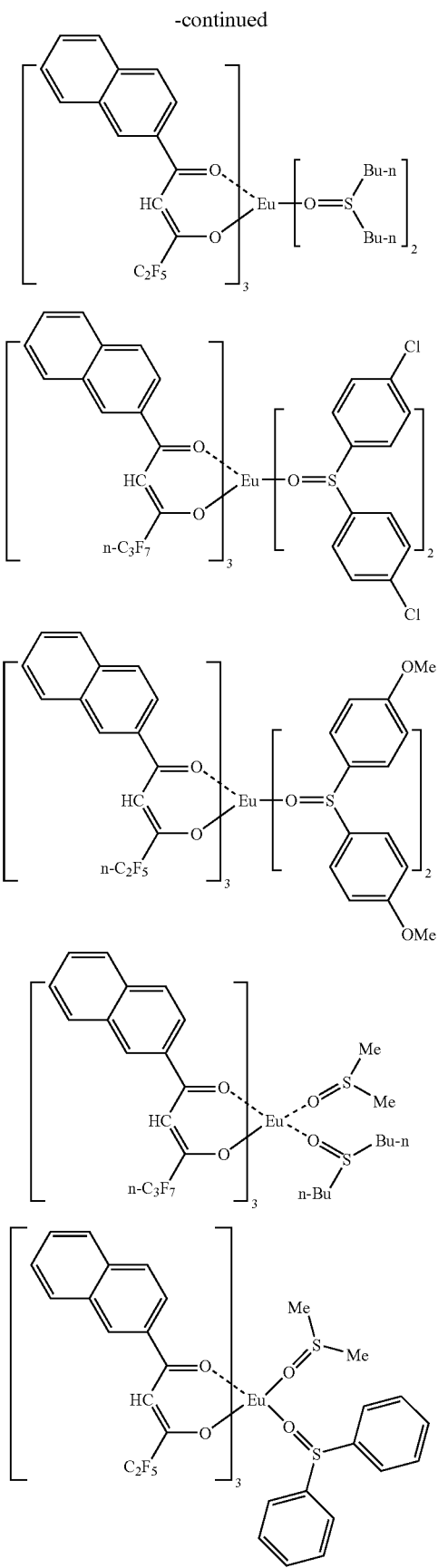
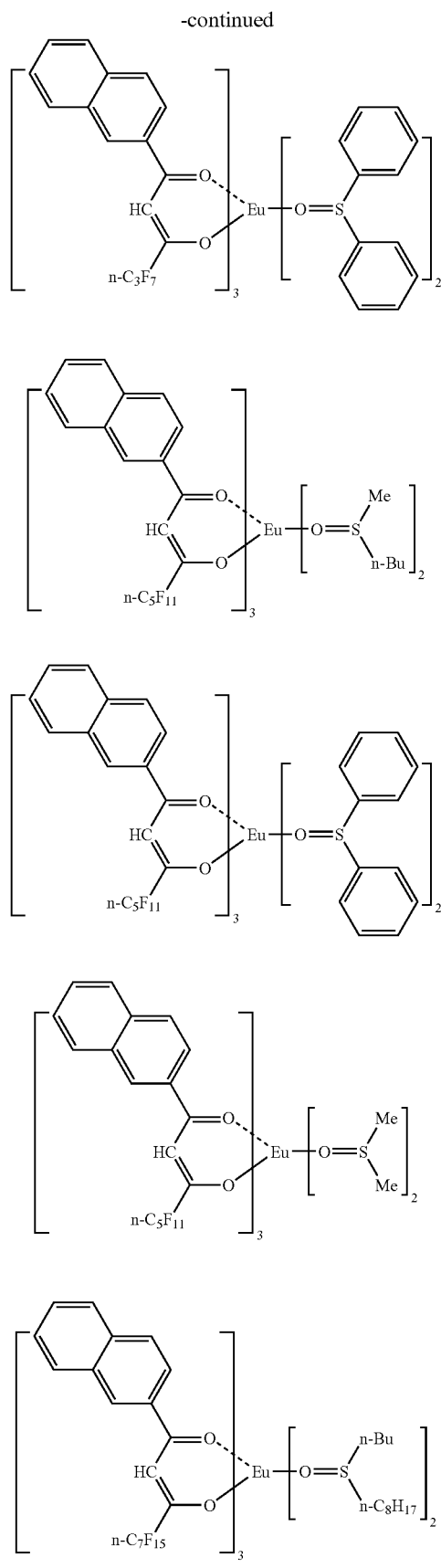

-continued
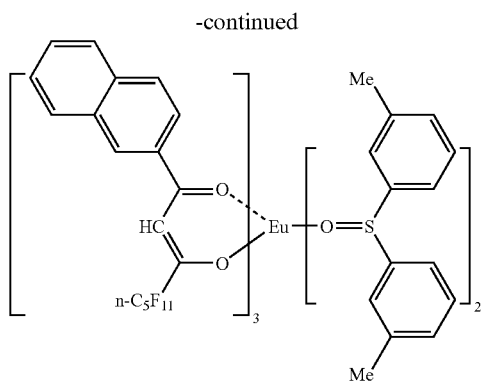
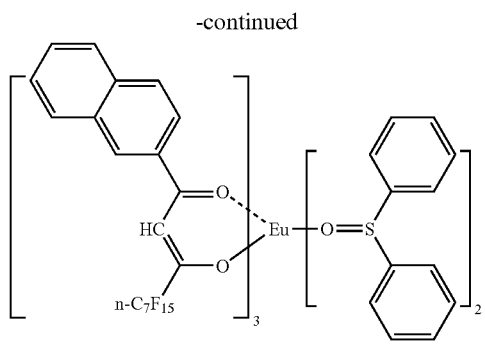
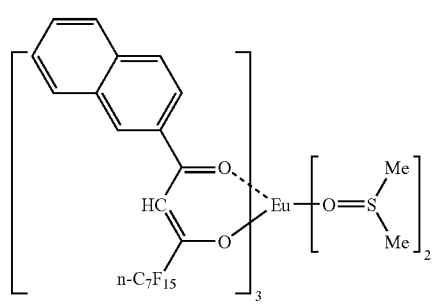
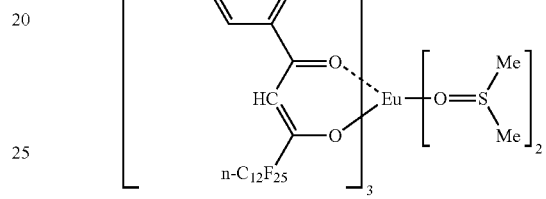
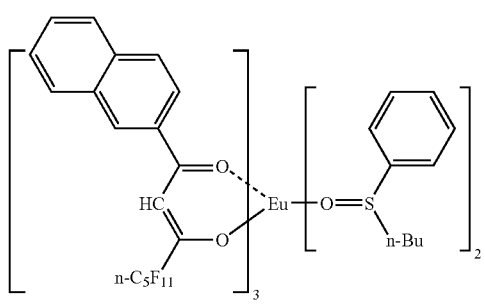
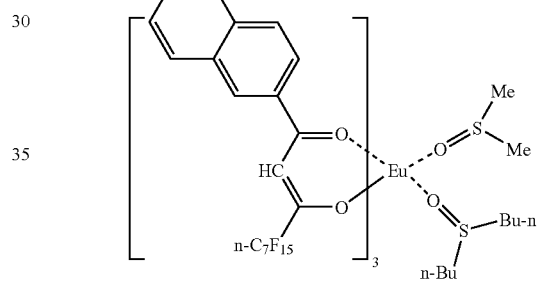
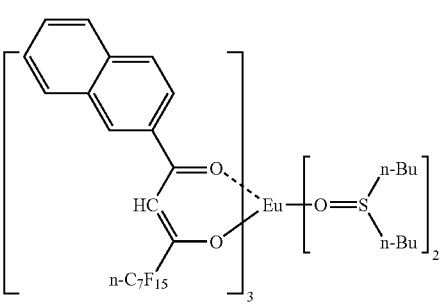
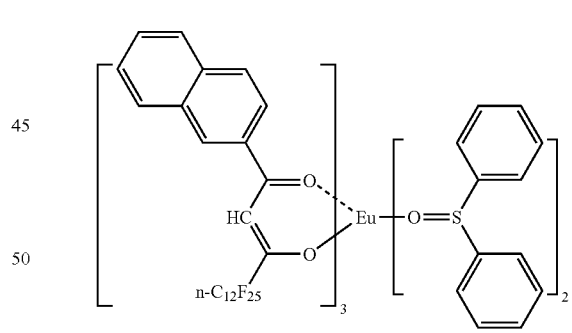
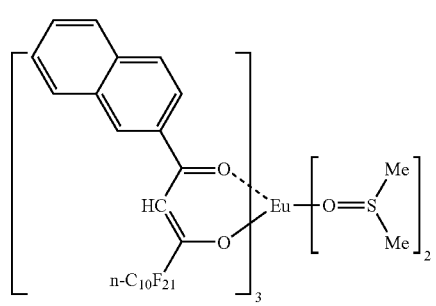
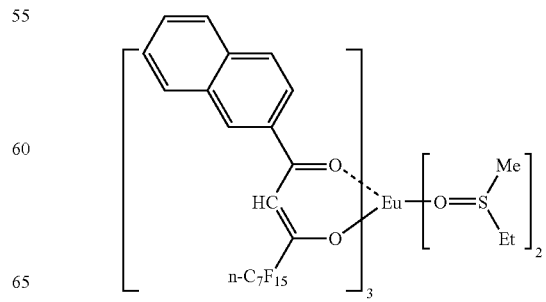

-continued

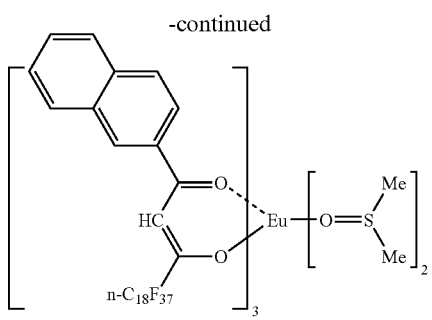

The luminous compound obtained is colorless and used as the ultraviolet rays-exciting-fluorescent coloring agent of the ink composition of the present invention. The ink composition of the present invention is obtained by dissolving the luminous compound in liquid medium and preferably an alcohol solvent, and mixing this with optional components usually contained in an ink composition such as a binder resin, various surfactants and the like. Further, the alcohol solvent means a solvent containing alcohol as a main component. For example, a mixture of alcohol with water is included in the alcohol solvent when the alcohol is contained as a main component. Hereat, the main component means a component contained in the solvent by 60% by weight or more and preferably 80% by weight or more.

The compounding amount of the luminous compound is an amount in which the concentration of the luminous compound in the whole amount of the ink composition is 0.001 to 5% by weight and preferably 0.1 to 3% by weight. When the concentration of the luminous compound in the ink composition is less than 0.001% by weight, emission quantity lessens and the emission is hardly to read, and when it exceeds 5% by weight, self-absorption is generated and emission intensity may lessen.

The alcohol solvent used for the ink composition of the present invention includes specifically aliphatic alcohol solvents such as methanol, ethanol, propanol and isopropanol and a mixture thereof. The alcohol solvent may contain water up to 30% by weight and preferably up to 10% by weight. The amount by which the alcohol solvent is contained in the ink composition is preferably 60% by weight or more based on the total amount of the ink composition, namely, from 60% by weight to all of the residual amount. The compounding amount of the alcohol solvent is more preferably 80 to 95% by weight based on the total amount of the ink composition.

Further, in the ink composition of the present invention can be added ether solvents such as ethylene glycol monomethyl ether, ethylene glycol monoethyl ether and propylene glycol monomethyl ether; glycol solvents such as ethylene glycol, diethylene glycol and propylene glycol (divalent alcohol solvent); polyols such as 1,2-hexanediol and 2,4,6-hexanetriol, in order to improve the stability of an ink and to prevent drying at the edge of an pen and a nozzle. The addition amount is preferably less than 30% by weight based on the ink composition of the invention.

The ink composition of the present invention may contain ketone solvents such as acetone, methyl ethyl ketone, methyl isobutyl ketone, cyclohexanone and 4-methoxy-4-methyl-pentanone; hydrocarbons such as cyclohexane, methylcyclohexane, n-pentane, n-hexane and n-heptane; ester solvents such as ethyl acetate and n-propyl acetate; dimethylsulfoxide, n-methyl-2-pyrrolidone, γ-butyrolactone, toluene, xylene and petroleum solvents with high boiling point, if required. These solvents are used alone or a mixture of a plural number of kinds.

The preferable solvent is an alcohol solvent capable of dissolving the luminous compound at comparatively high concentration and stably so that the emission intensity of the luminous compound that the ink composition of the present invention contains is the maximum.

The binder resin used for the ink composition of the present invention is a component for favorably fixing the luminous compound on a recorded medium. Those in which solubility for the above-mentioned solvent is good and by which the viscosity of the ink composition can be suitably adjusted are used for the binder resin. The specific example of preferable binder resin includes resins below. Namely, there are exemplified polyvinyl resins such as polyvinyl alcohol, polyvinyl butyral, polyvinyl pyrrolidone and vinyl pyrrolidone-vinyl acetate copolymer; polyamine resins such as polyallyl amine, polyvinyl amine and polyethylene imine; polyacrylate resins such as polymethyl acrylate, polyethylene acrylate, polymethyl methacrylate and polyvinyl methacrylate; and amino resins, alkyd resins, epoxy resins, phenol resins, polyester imide resins, polyamide resins, polyamidoimide resins, silicone resins, ketone resins, rosin, rosin-modified resins (phenol, maleic acid, fumaric acid resin and the like), petroleum resins, cellulose resins such as ethylcellulose and nitrocellulose, natural resins (gum Arabic, gelatin and the like) and the like.

Particularly preferable binder resin is a polyvinyl resin, a polyacrylate resin, a polyamine resin and the like that are usually used for an ink for handwriting tools, an inkjet ink or a printing ink.

The compounding amount of these binder resins exemplifies 0 to 30% by weight based on the total amount of the ink composition and preferably 1 to 20% by weight. When it is less than 0.5% by weight, the luminous compound maynot be adequately fixed on an impermeable recorded article. When it exceeds 30% by weight, the discharge stability of the ink composition may be occasionally lowered. Further, since the binder layer covers thickly around the luminous compound, there is fear of not only causing the lowering of emission of the luminous compound, but also there is possibility that the generation of emission originated in the resin is obstacle.

Further, when a mixture of alcohol and water is used as the alcohol solvent, there can be added various surfactants (for example, anionic, nonionic and cationic surfactants such as alkyl sulfate eaters, phosphate esters, polyoxyethylene alkyl ethers and alkylamine salts; amphoteric surfactants, or fluorine surfactants, or acetylene glycol surfactants), dispersants (for example, rosin acid soap, stearic acid soap, oleic acid soap, sodium di-β-naphthylmethane disulfate, sodium lauryl sulfate, sodium diethylhexyl sulfosuccinate) or cyclodextrine (CD) (for example, β-CD, dimethyl-β-CD, methyl-β-CD, hydroxyethyl-β-CD, hydroxypropyl-β-CD and the like), defoaming agents and the like. These additives can be added at 0.1 to 5% by weight based on the ink composition and preferably about 1 to 3% by weight.

The luminous compound that the ink composition of the present invention contains exhibits generally solubility or good dispersibility for the above-mentioned various solvents and/or resins and the like and exhibits luminescent light at a red color region (610 to 630 nm) when this is excited by ultraviolet rays (refer to Examples). For example, ultraviolet rays (about 365 nm) are irradiated to the organic solvent solution (for example, ethanol solution) of the luminous compound of the present invention with an ultraviolet lamp such as a black light lamp, the luminous compound is excited and can emit a light at a red region. Accordingly, secret information printed by using the ink composition of the present invention does not emit under visible light, in contrast can emit red color under ultraviolet rays. The ink composition is thus useful as a security ink.

EXAMPLES

Synthesis Example 1

Europium complex 1 (1.0 g, 0.865 mmol) having a structure represented by the above chemical formula was added to 5 mL of dimethylsulfoxide (DMSO). The resulting mixture was stirred on heating (for about one hour at about 40° C.) to obtain 0.9 g of the luminous compound 1-a) (NEFA-Eu-DMSO) having a structure represented by the formula below.

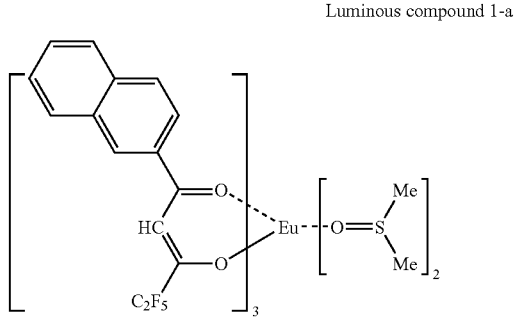

Luminous compound 1-a

Figure 8A:
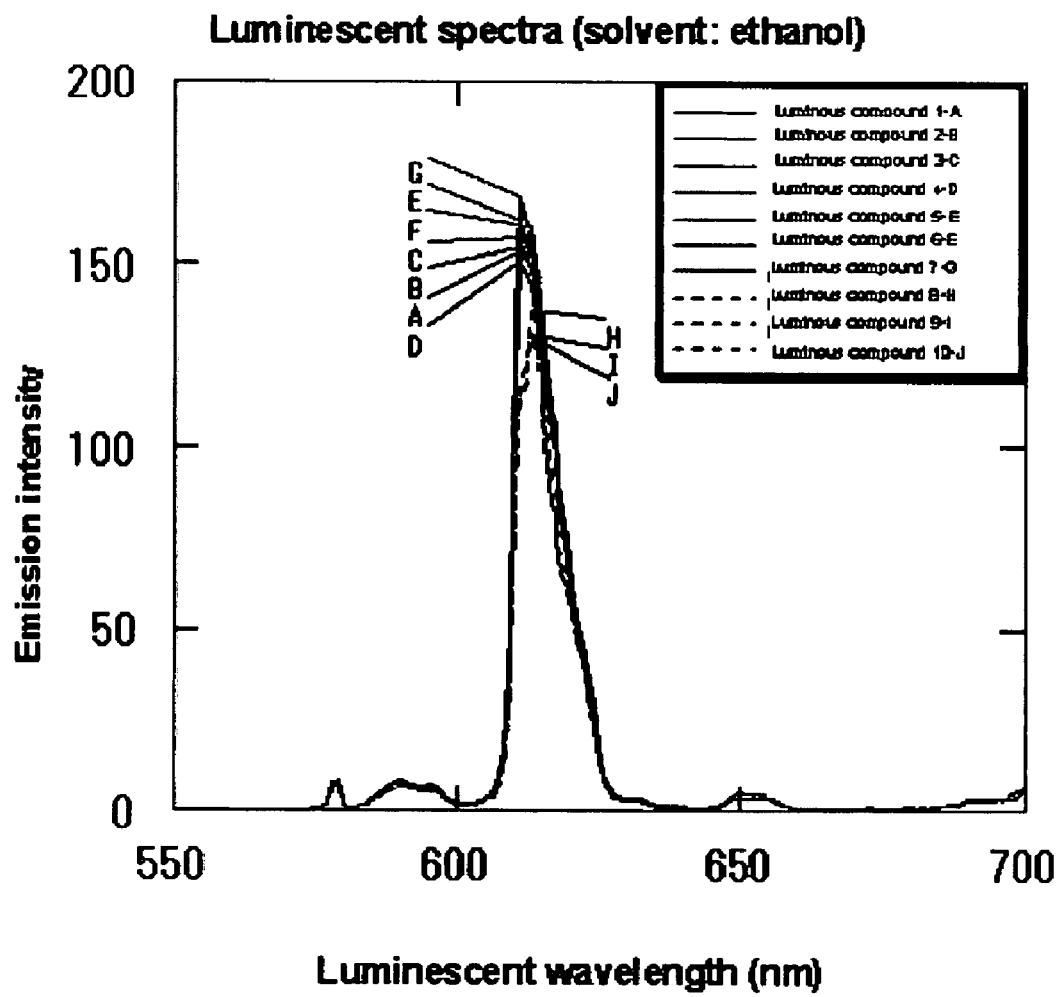
FIG. 8a is the luminescent spectra of the luminous compounds 1-a to 7-a of the present invention used in Example and the luminous compounds 8 to 10 in Comparative Examples 1 to 3 that use ethanol as a solvent. Further
Figure 8B:
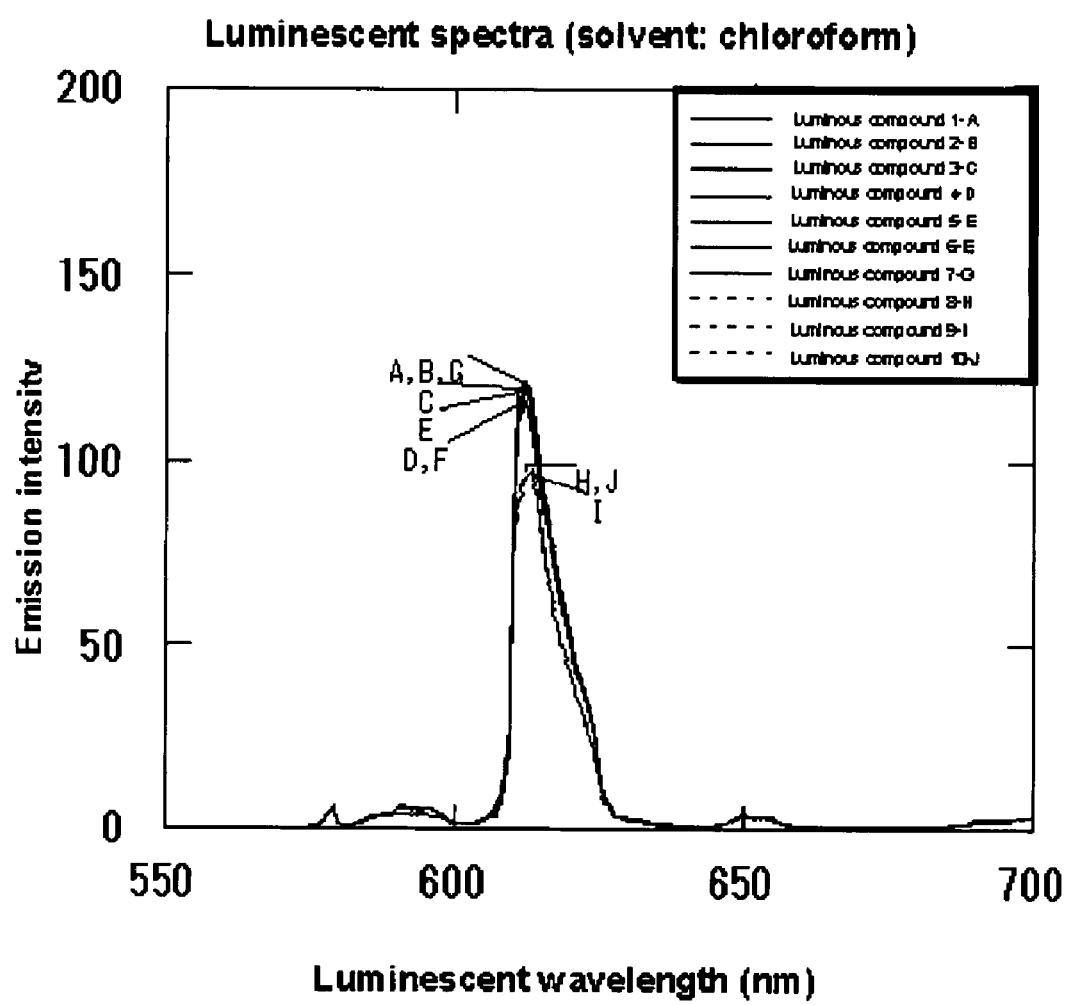
FIG. 8b is the luminescent spectra of the luminous compounds 1-a to 7-a of the present invention used in Example and the luminous compounds 8 to 10 in Comparative Examples 1 to 3 that use chloroform as a solvent. Further
Figures 1, 8A:
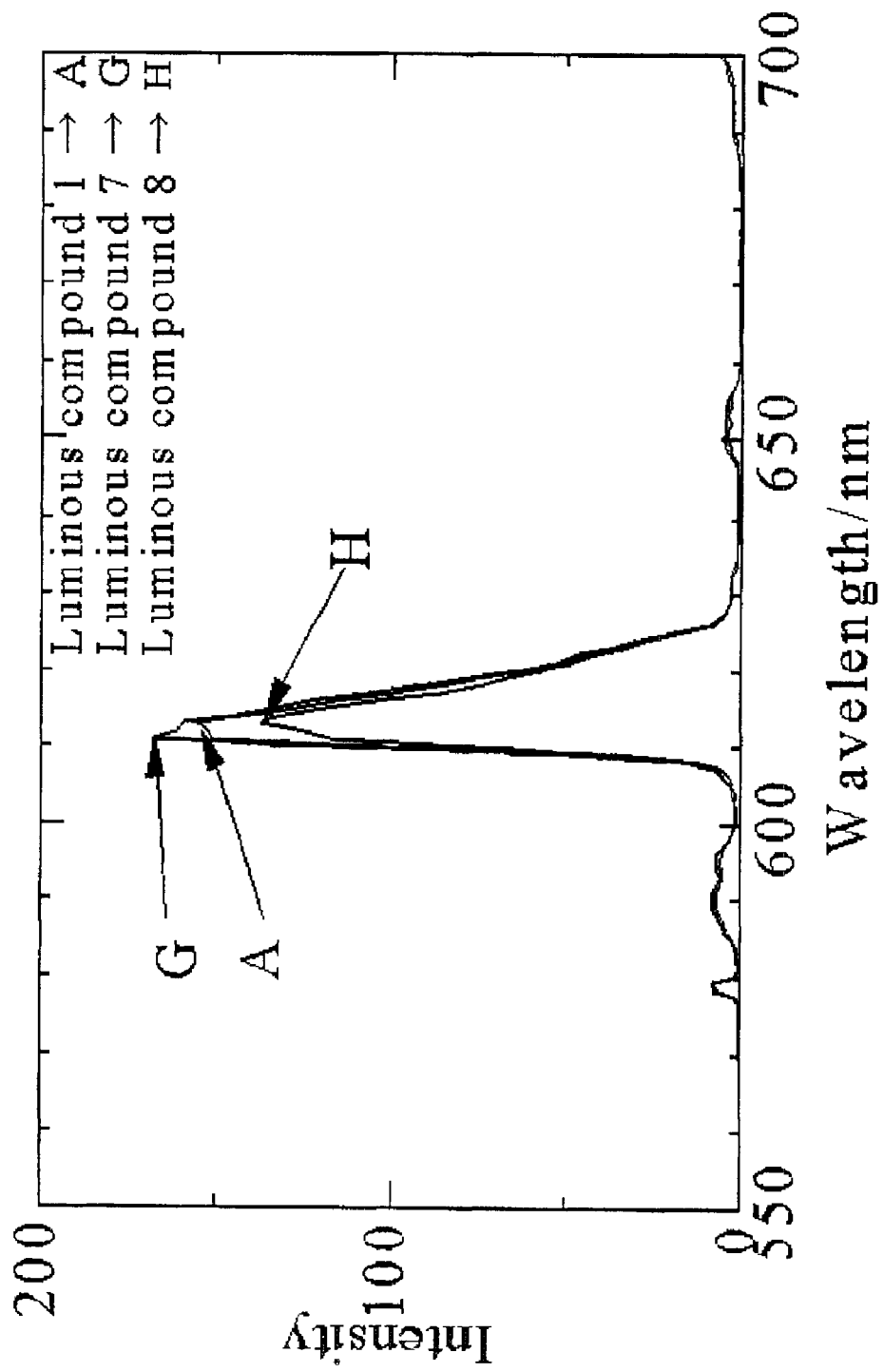

The results of atomic absorption analysis and elemental analysis for the above-mentioned luminous compound 1-a are shown in Table 1, and $^1$H-NMR and $^{13}$C-NMR spectra of the compound 1-a are shown in FIG. 1. These results support that the luminous compound 1-a has the structure of the above-mentioned chemical formula.

P-diketone derivative, 4,4,5,5,5-pentafluoro-1-(2-naphthyl)-1,3-butandione (NEFA) (0.95 g, 3.0 mmol) and europium chloride (III) hexahydrate (0.37 g, 1.0 mmol) were mixed on heating in DMSO (15 mL) in the presence of 1N NaOH (3 ml, 3.0 mmol) to obtain 1.0 g of the luminous compound 1-b (NEFA-Eu-DMSO). The atomic absorption analysis, elemental analysis, $^1$H-NMR and $^{13}$C-NMR spectra shows that the luminous compound 1-b is equated with the luminous compound 1-a.

Synthesis Example 2

The above-mentioned europium complex 1 (2.0 g, 1.642 mmol) and dibutylsulfoxide (DBSO) (0.53 g, 3.284 mmol) were added to 30 mL of chloroform. The resulting mixture was stirred on heating (for about 0.5 hour at about 40° C.) to obtain 0.4 g of the luminous compound 2 (NEFA-Eu-DBSO) having a structure represented by the formula below.

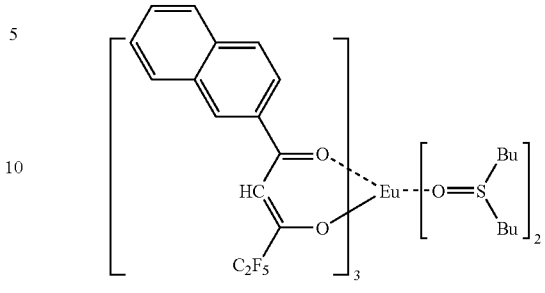

Luminous compound 2

Figures 2, 8A:
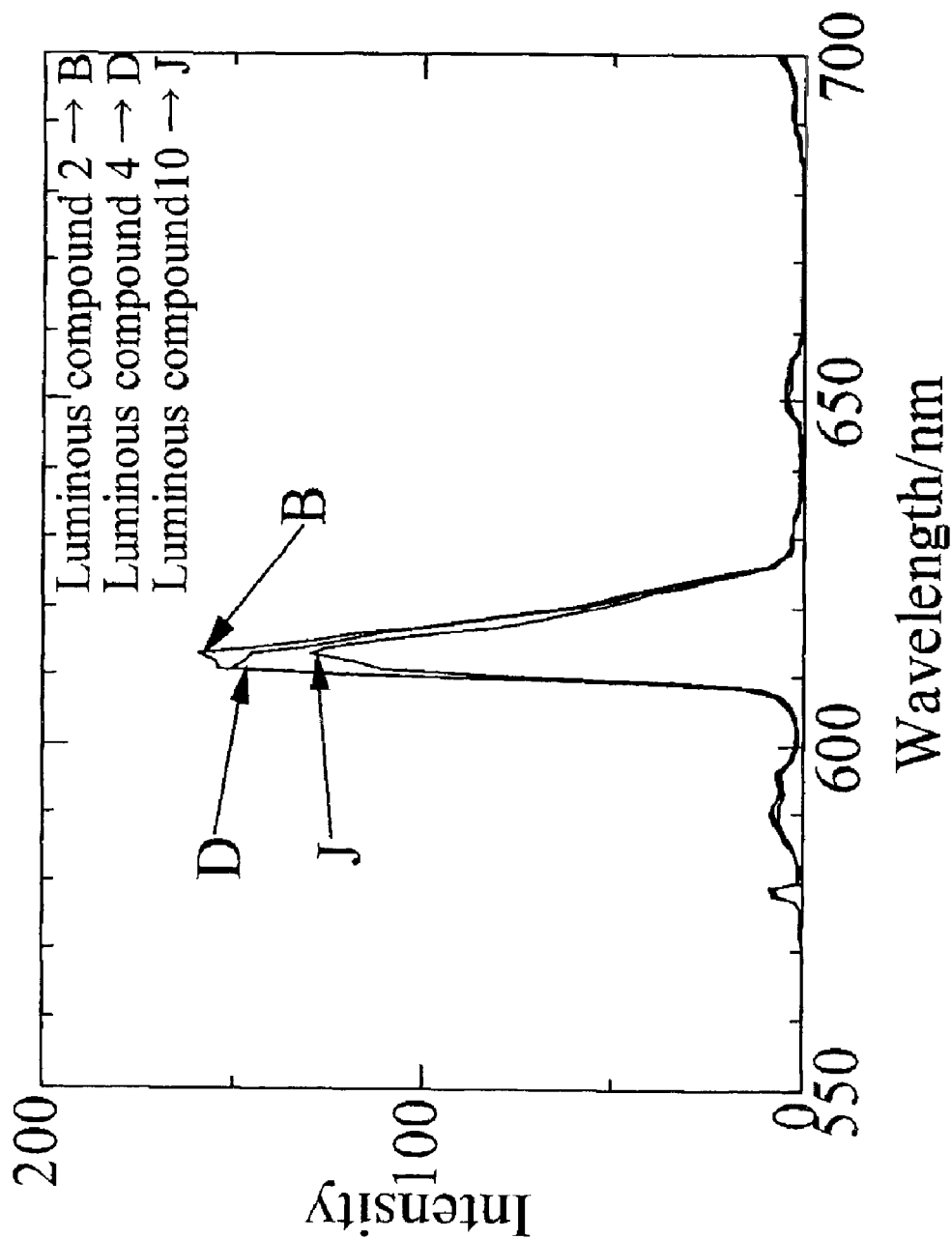

The results of atomic absorption analysis and elemental analysis for the above-mentioned luminous compound 2 are shown in Table 1, and $^1$H-NMR and $^{13}$C-NMR spectra of the compound 2 are shown in FIG. 2. These results support that the luminous compound 2 has the structure of the above-mentioned chemical formula.

Synthesis Example 3

The above-mentioned europium complex 1 (1.0 g, 0.865 mmol) and diphenylsulfoxide (DPSO) (0.35 g, 1.730 mmol) were added to 30 mL of chloroform. The resulting mixture was stirred on heating (for about 0.5 hour at about 40° C.) to obtain 0.9 g of the luminous compound 3 (NEFA-Eu-DPSO) having a structure represented by the formula below.

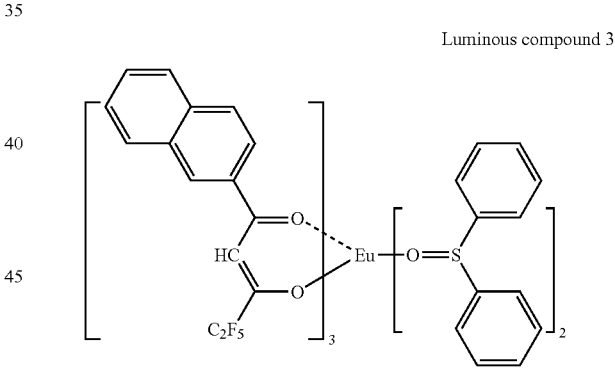

Luminous compound 3

Figures 3, 8A:
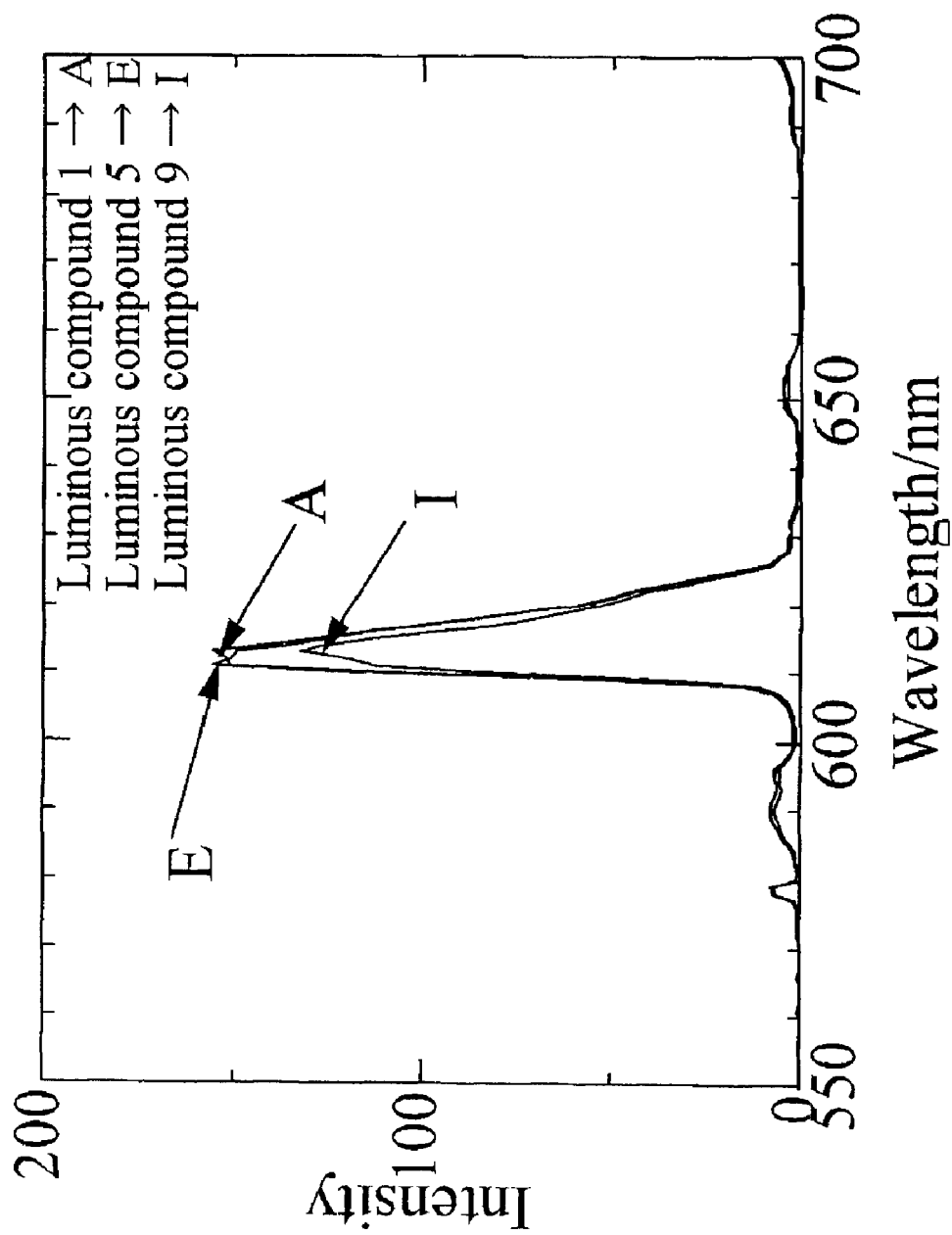

The results of atomic absorption analysis and elemental analysis for the above-mentioned luminous compound 3 are shown in Table 1, and $^1$H-NMR and $^{13}$C-NMR spectra of the compound 3 are shown in FIG. 3. These results support that the luminous compound 3 has the structure of the above-mentioned chemical formula.

Synthesis Example 4

Europium complex 2 (1.248 g, 1.0 mmol) represented by the above-mentioned chemical formula and DBSO (0.325 g, 2.0 mmol) were added to 25 mL of chloroform. The resulting mixture was stirred on heating (for about 0.5 hour at about 40° C.) to obtain 1.0 g of the luminous compound 4 (NPFA-Eu-DBSO) having a structure represented by the formula below.

Luminous compound 4

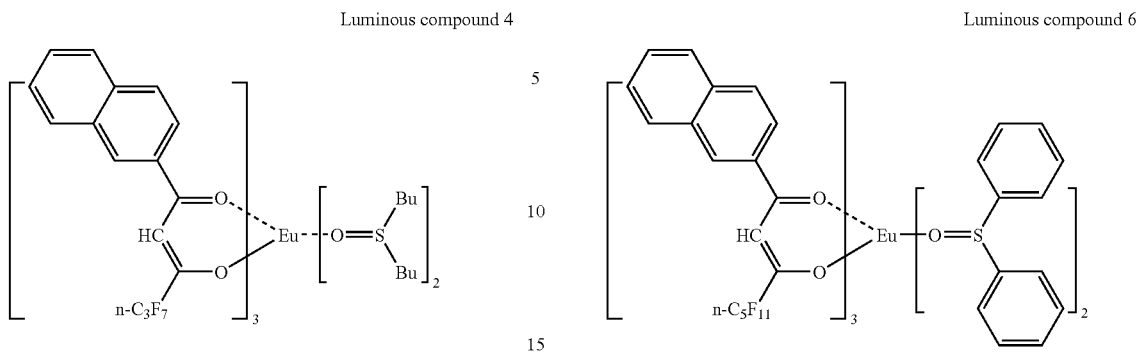

Figures 4, 8A:
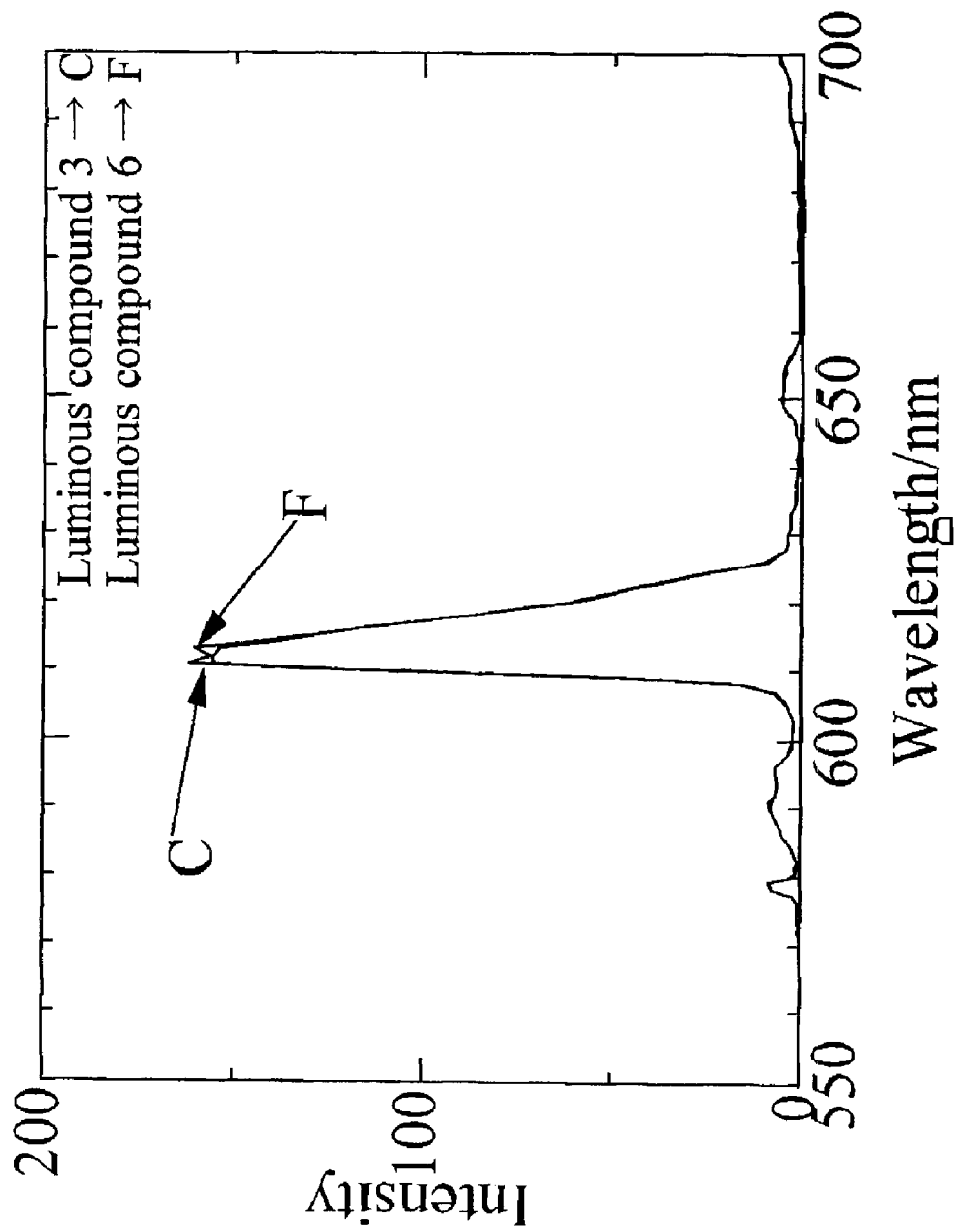
Figures 1, 8B:
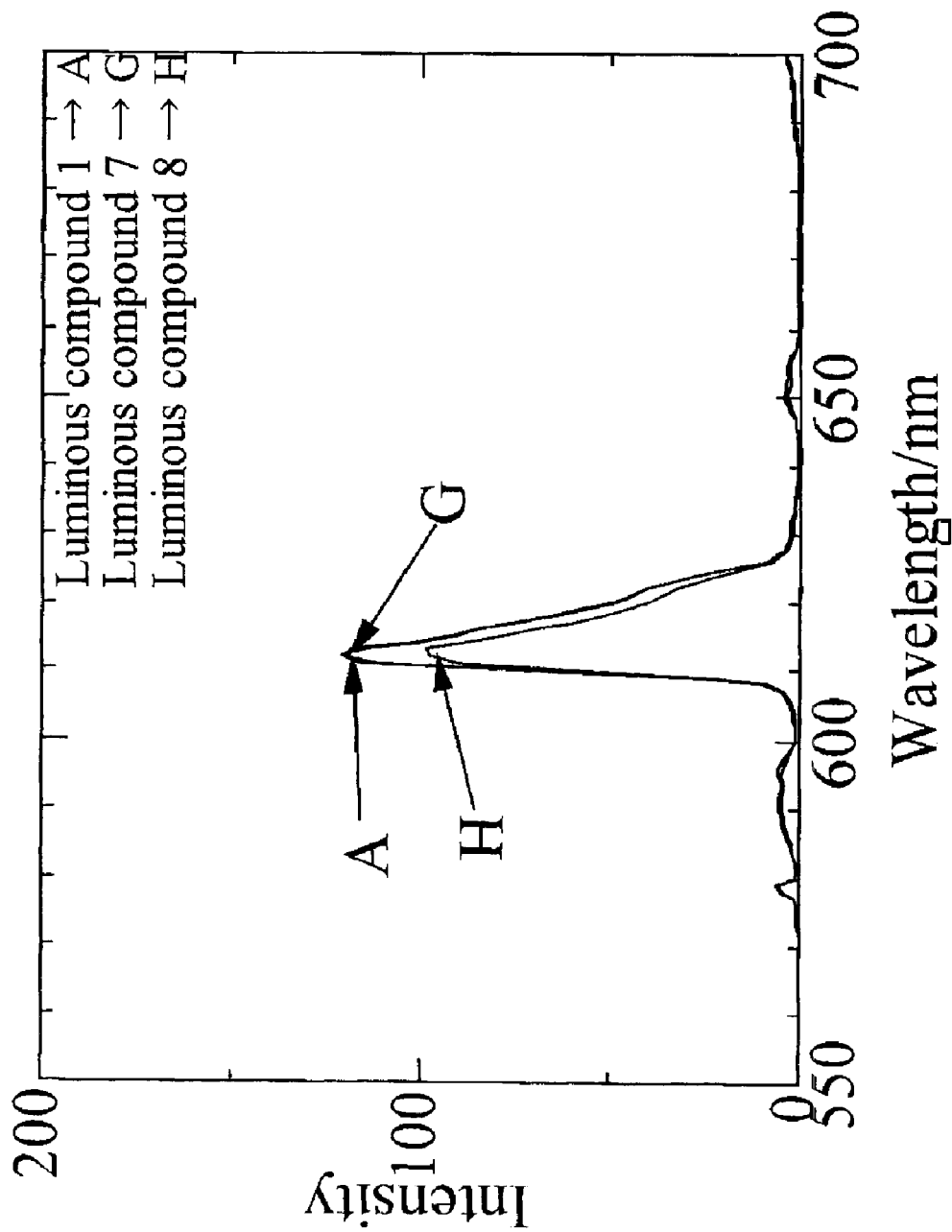
Figures 2, 8B:
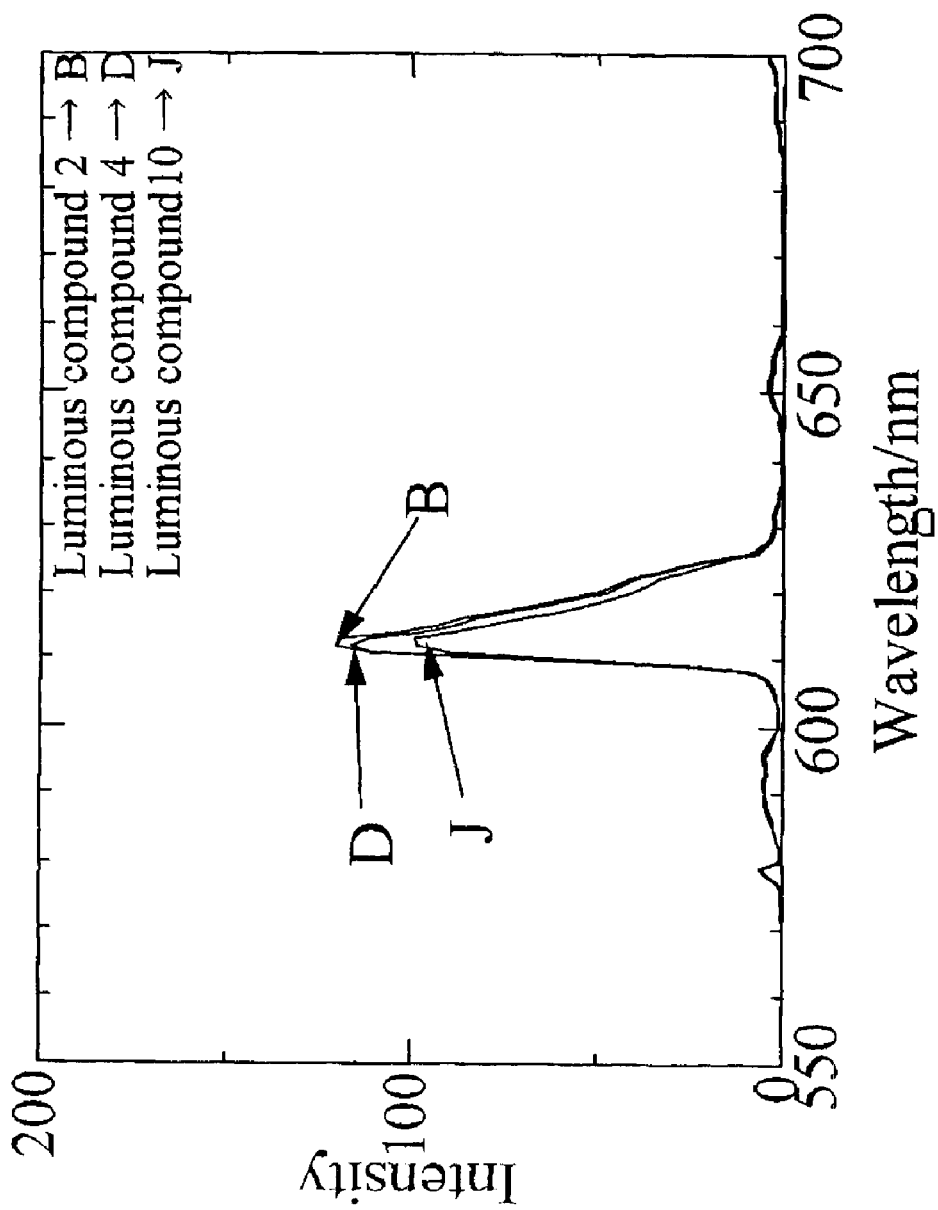
Figures 3, 8B:
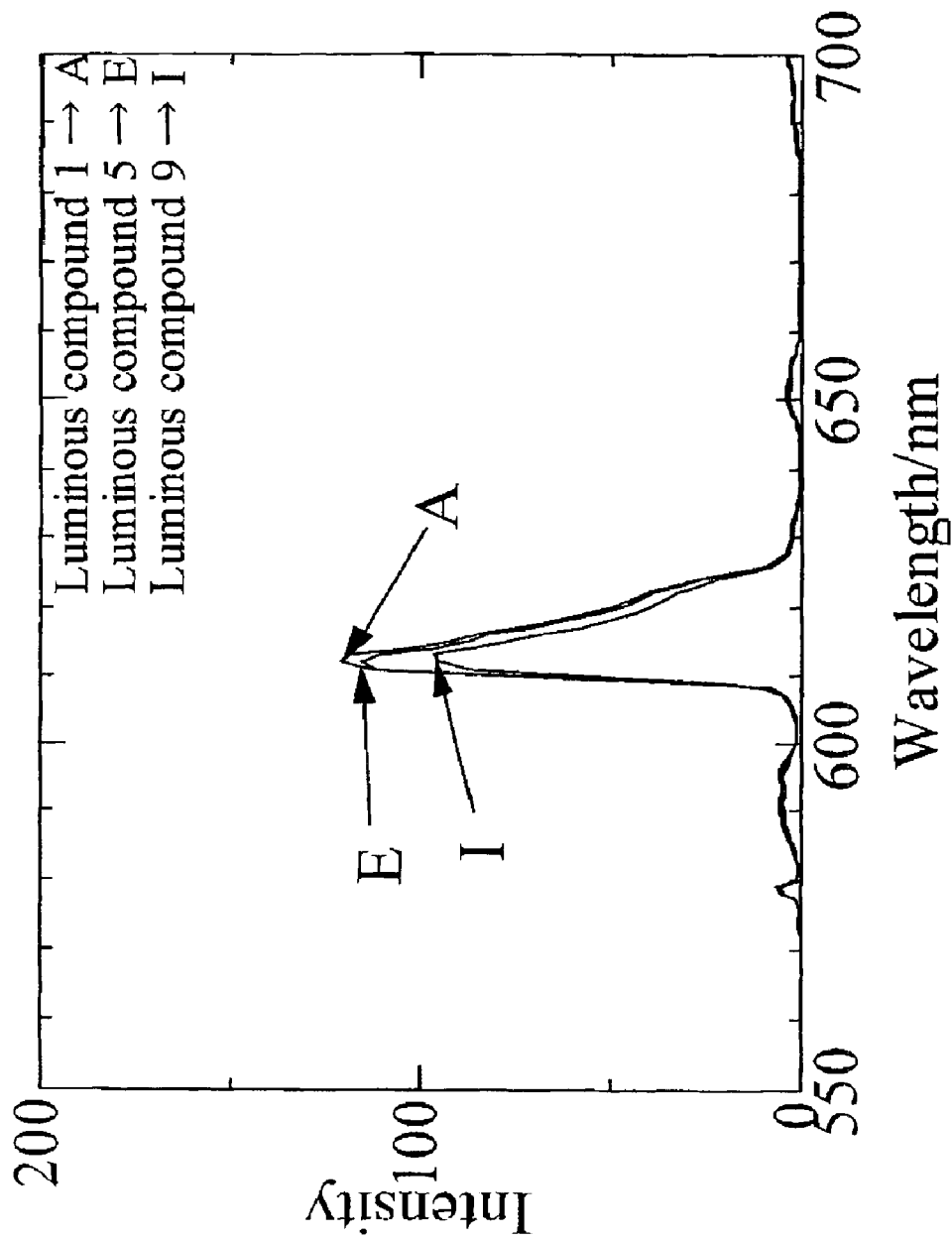
Figures 4, 8B:
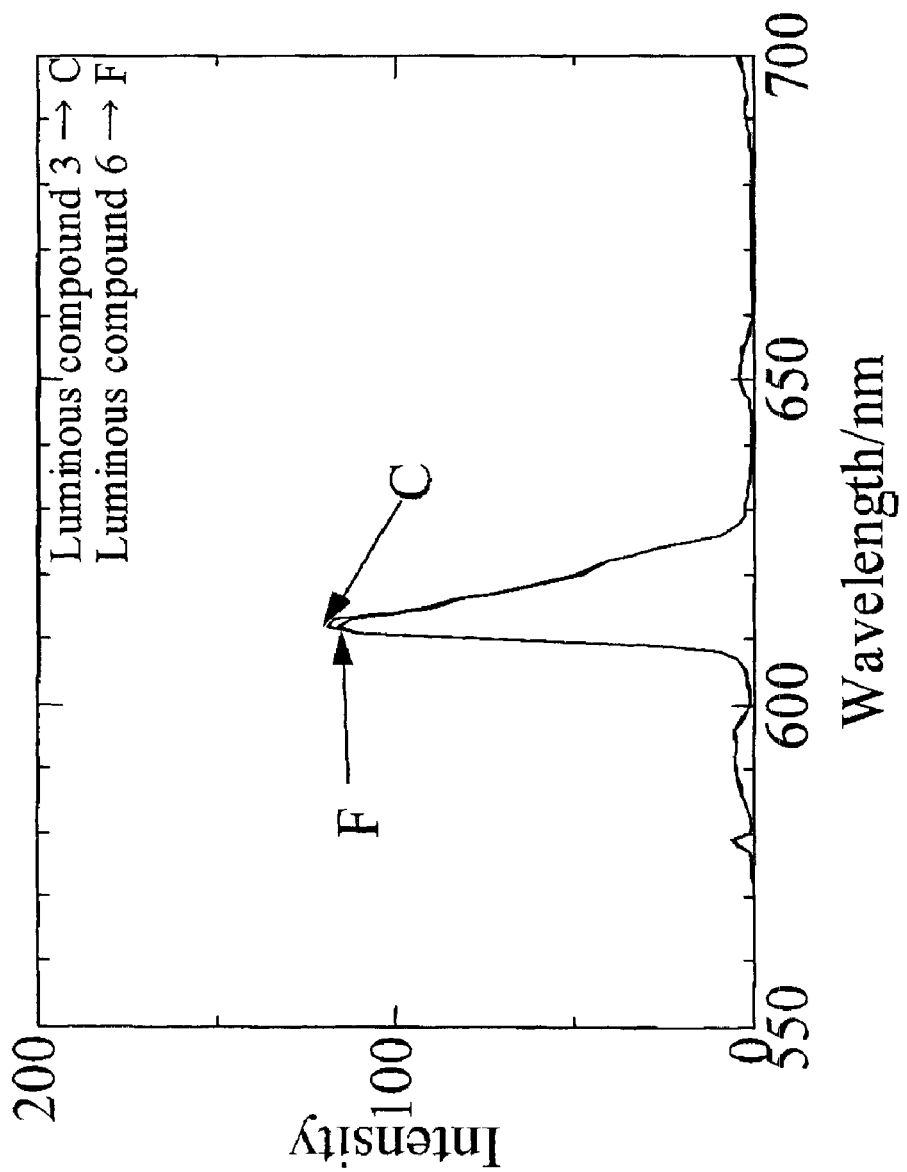

The results of atomic absorption analysis and elemental analysis for the above-mentioned luminous compound 4 are shown in Table 1, and $^1$H-NMR and $^{13}$C-NMR spectra of the compound 4 are shown in FIG. 4. These results support that the luminous compound 4 has the structure of the above-mentioned chemical formula.

Synthesis Example 5

The above-mentioned europium complex 2 (2.496 g, 2.0 mmol), DMSO (0.156 g, 2.0 mmol) and DBSO (0.325 g, 2.0 mmol) were added to 20 mL of chloroform. The resulting mixture was stirred on heating (for about 1.0 hour at about 40° C.) to obtain 2.2 g of the luminous compound 5 (NPFA-Eu-DBSO-DMSO) having a structure represented by the formula below.

Luminous compound 5

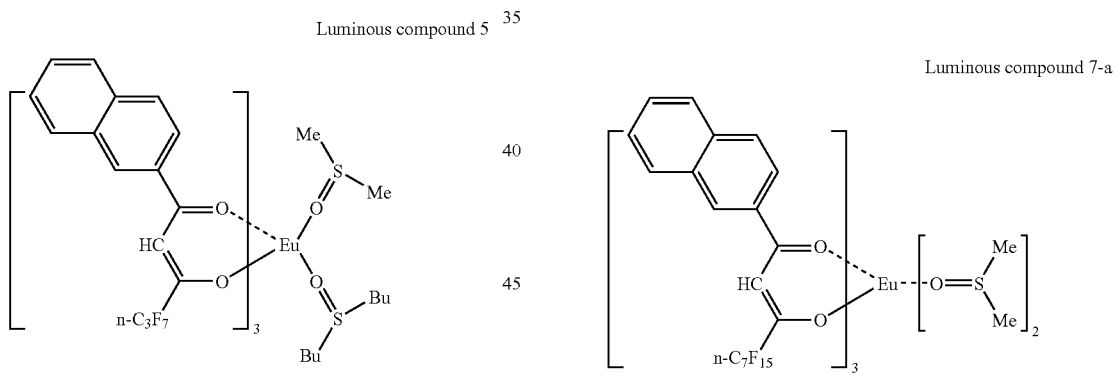

Figure 5A:
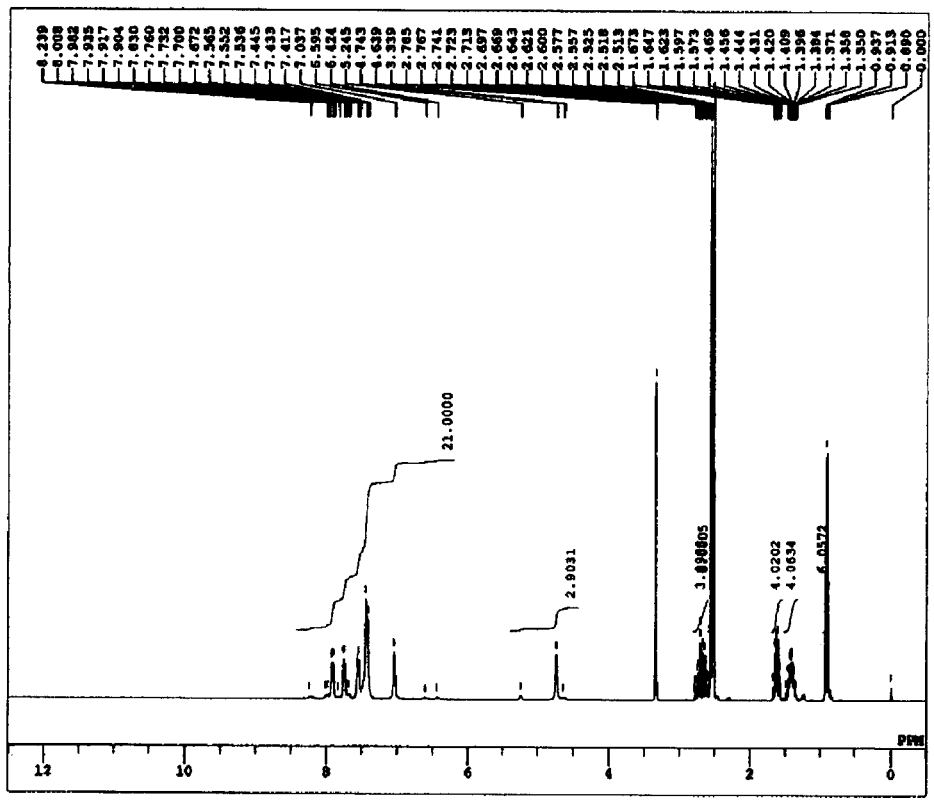
FIG. 5a is the $^1$H-NMR spectrum (5a) of the luminous compound 5 used in Example.
Figure 5B:
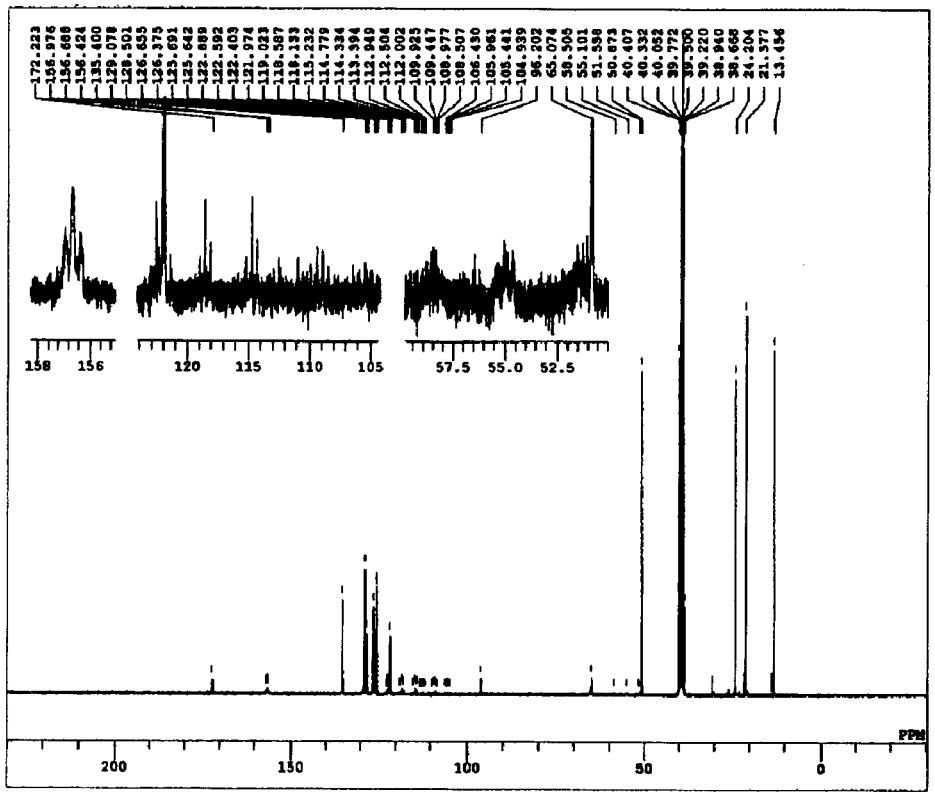
FIG. 5b is the $^{13}$C-NMR spectrum (5b) of the luminous compound 5 used in Example.

The results of atomic absorption analysis and elemental analysis for the above-mentioned luminous compound 5 are shown in Table 1, and $^1$H-NMR and $^{13}$C-NMR spectra of the compound 5 are shown in FIG. 5. These results support that the luminous compound 5 has the structure of the above-mentioned chemical formula.

Synthesis Example 6

Europium complex 3 (1.55 g, 1.0 mmol), which is obtained by the same process as JP-A-2003-26969 (the Patent Literature 3) using 4,4,5,5,6,6,7,7,8,8,8-undecafluoro-1-(2-naphthyl)-1,3-octadione, and DPSO (0.404 g, 2.0 mmol) were added to 20 mL of chloroform. The resulting mixture was stirred (for about 1.0 hour at room temperature) to obtain 0.7 g of the luminous compound 6 (NPeFA-Eu-DPSO) having a structure represented by the formula below.

Luminous compound 6

Figure 6A:
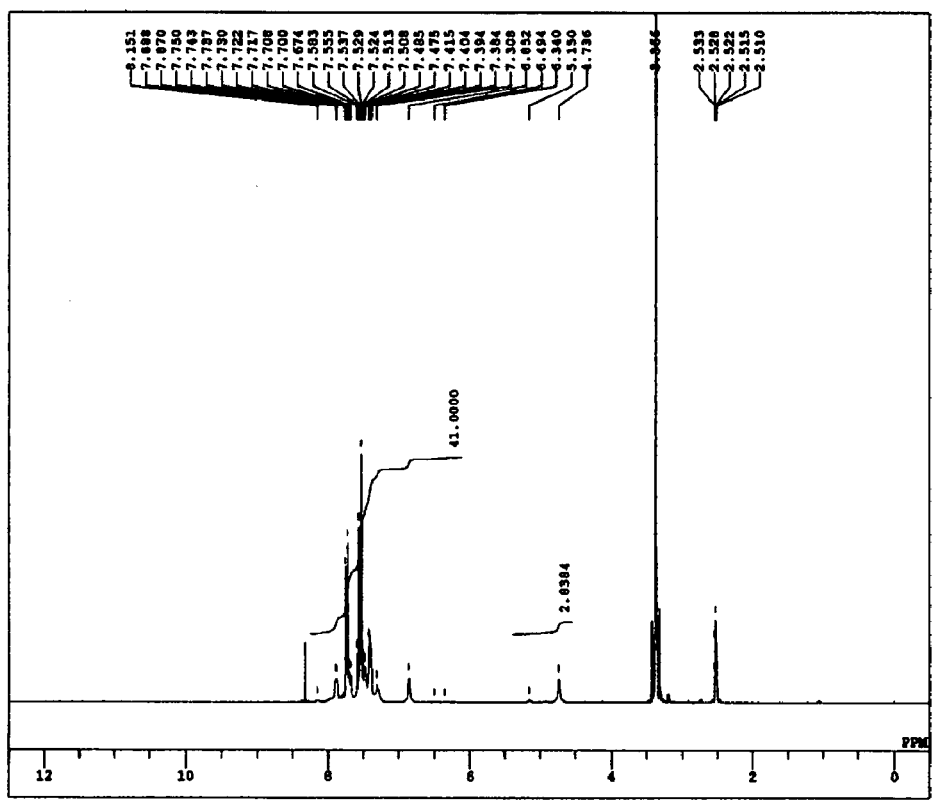
FIG. 6a is the $^1$H-NMR spectrum (6a) of the luminous compound 6 used in Example.
Figure 6B:
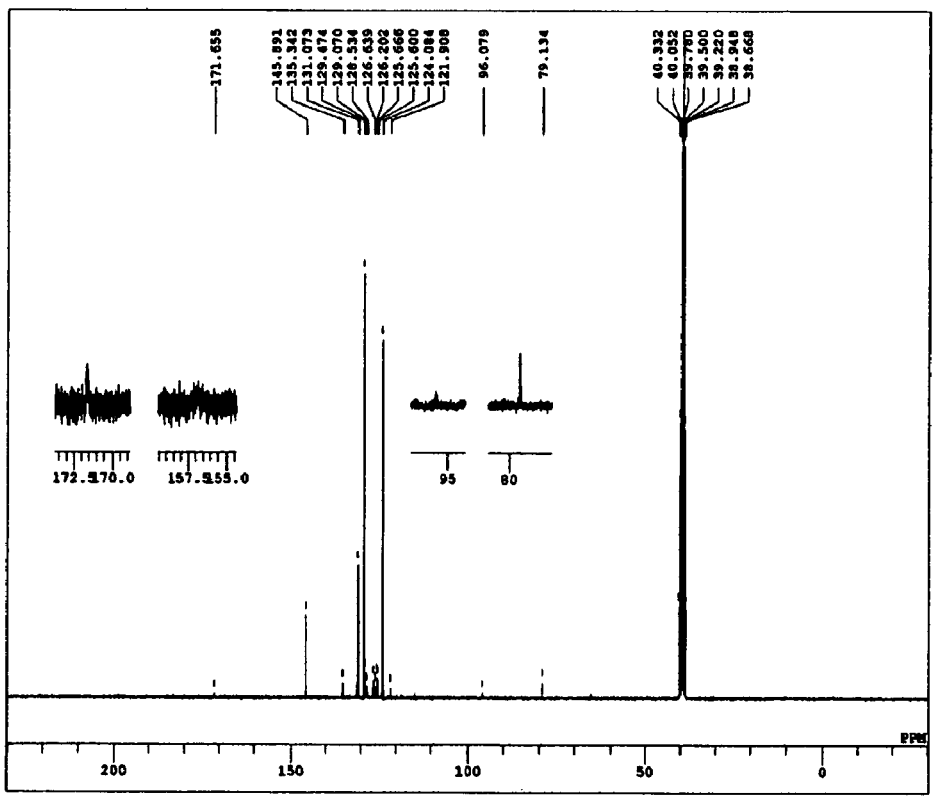
FIG. 6b is the $^{13}$C-NMR spectrum (6b) of the luminous compound 6 used in Example.

The results of atomic absorption analysis and elemental analysis for the above-mentioned luminous compound 6 are shown in Table 1, and $^1$H-NMR and $^{13}$C-NMR spectra of the compound 6 are shown in FIG. 6. These results support that the luminous compound 6 has the structure of the above-mentioned chemical formula.

Synthesis Example 7

The europium complex 4 (1.0 g, 0.54 mmol) having a structure represented above was mixed in 40 mL of DMSO on heating (for about 0.5 hour at 80° C.) to obtain the luminous compound 7-a (NHFA-Eu-DMSO) (1.0 g) having a structure represented by the formula below.

Luminous compound 7-a

Figure 7A:
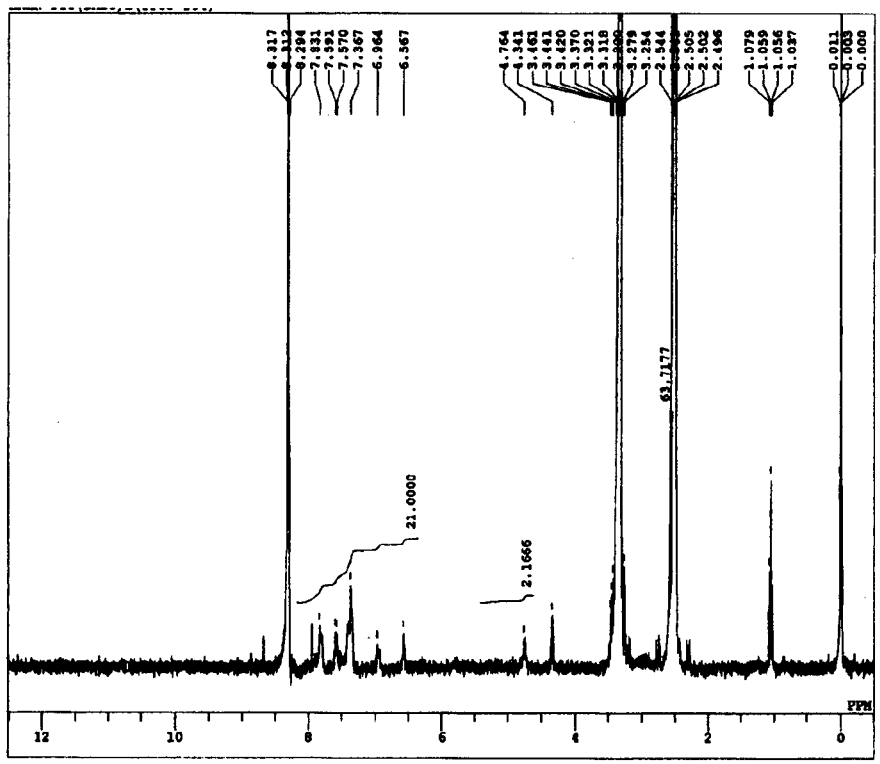
FIG. 7a is the $^1$H-NMR spectrum (7a) of the luminous compound 7-a used in Example.
Figure 7B:
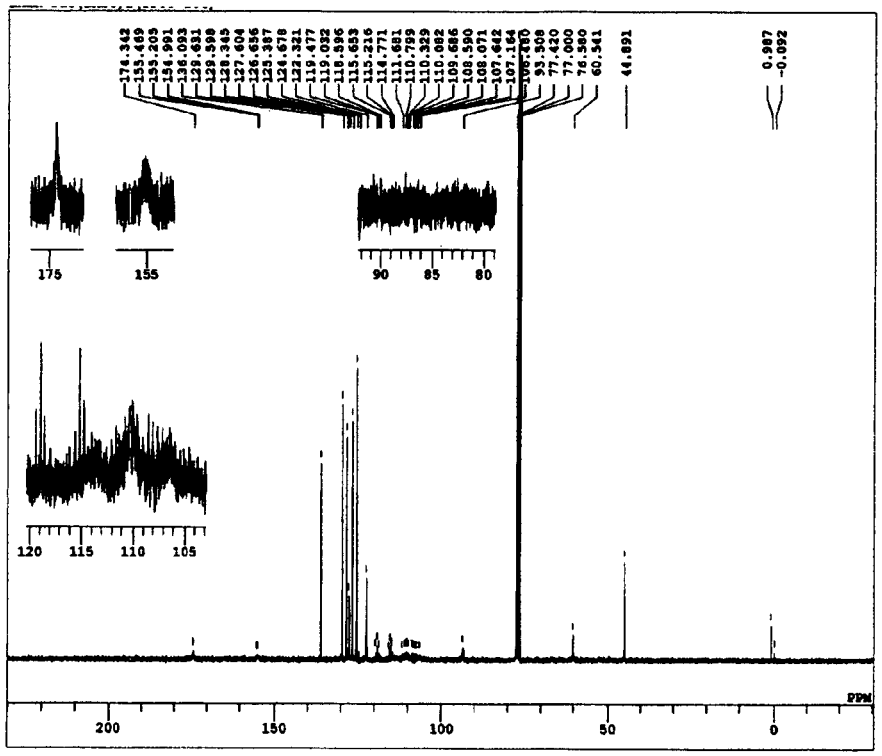
FIG. 7b is the $^{13}$C-NMR spectrum (7b) of the luminous compound 7-a used in Example.

The results of atomic absorption analysis and elemental analysis for the above-mentioned luminous compound 7-a are shown in Table 1, and $^1$H-NMR and $^{13}$C-NMR spectra are shown in FIG. 7. These results support that the luminous compound 7-a has the structure of the above-mentioned chemical formula.

β-diketone derivative, 4,4-difluoro-4-perfluorohexyl-1-(2-naphthyl)-1,3-butandione (NHFA) (1.70 g, 3.0 mmol) and europium (III) chloride hexahydrate (0.37 g, 1.0 mmol) were mixed on heating in DMSO (15 mL) in the presence of 1N NaOH (3 mL, 3.0 mmol) to obtain 1.5 g of the luminous compound 7-b (NHFA-Eu-DMSO). The atomic absorption analysis, elemental analysis, $^1$H-NMR and $^{13}$C-NMR spectra shows that it is equated with the luminous compound 7-a.

Comparative Synthesis Example 1

A compound (NTFA-Eu) having a structure represented by the formula below;

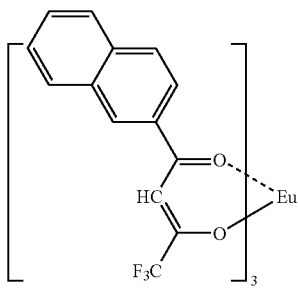

was obtained according to JP-A-2003-26969 (the Patent Literature 3).

The above-mentioned NTFA-Eu (5.0 g, 5.28 mmol) and DMSO (0.83 g, 10.56 mmol) were mixed in 50 mL of chloroform on heating (for about 0.5 hour at 50° C.) to obtain 4.4 g of the luminous compound 8 (NTFA-Eu-DMSO) having a structure represented by the formula below.

Luminous compound 8

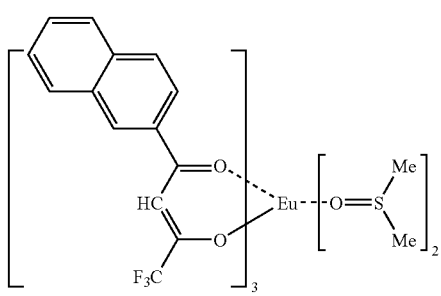

The results of atomic absorption analysis and elemental analysis for the above-mentioned luminous compound 8 are shown in Table 1. These results support that the luminous compound 8 has the structure of the above-mentioned chemical formula.

Comparative Synthesis Example 2

The above-mentioned NTFA-Eu (5.0 g, 5.28 mmol) and deuterated dimethylsulfoxide (DMSO-$d_6$) (0.89 g, 10.56 mmol) were mixed in 50 mL of chloroform on heating (for about 0.5 hour at 50° C.) to obtain 4.0 g of the luminous compound 9 (NTFA-Eu-DMSO-$d_6$) having a structure represented by the formula below.

Luminous compound 9

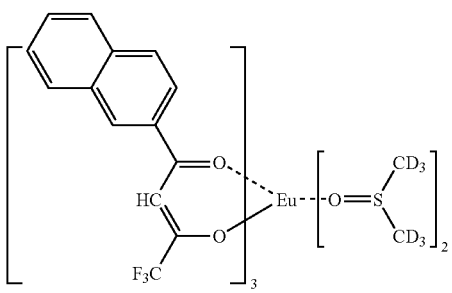

The results of atomic absorption analysis and elemental analysis for the above-mentioned luminous compound 9 are shown in Table 1. These results support that the luminous compound 9 has the structure of the above-mentioned chemical formula.

Comparative Synthesis Example 3

The above-mentioned NTFA-Eu (1.0 g, 1.06 mmol) and DBSO (0.34 g, 2.12 mmol) were mixed in 50 mL of chloroform on heating (for about 1.0 hour at 40° C.) to obtain 4.0 g of the luminous compound 10 (NTFA-Eu-DBSO) having a structure represented by the formula below.

Luminous compound 10

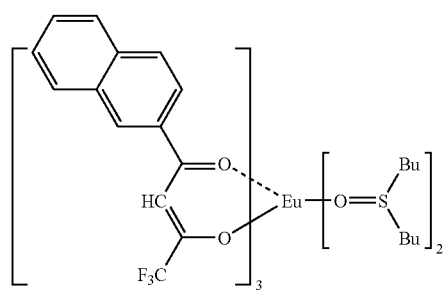

The results of atomic absorption analysis and elemental analysis for the above-mentioned luminous compound 10 are shown in Table 1. These results support that the luminous compound 10 has the structure of the above-mentioned chemical formula.

The physical property data of the luminous compounds 1-a to 10 obtained are summarized in Table 1.

TABLE 1

| Synthesis Example | Luminous compound | m.p. (° C.) | Atomic absorption analysis Upper step: measurement value (%) Lower step: theoretical value (%) Eu | Elemental analysis C | Elemental analysis H | Yield of product (%) | NMR data H-NMR | NMR data C-NMR |
|---|---|---|---|---|---|---|---|---|
| 1 | 1-a | 128-130 | 12.02 / 12.12 | 47.05 / 46.94 | 2.54 / 2.89 | 86.1 | 1a | 1b |
| 2 | 2 | 73-75 | 10.93 / 10.69 | 51.39 / 51.52 | 4.19 / 4.25 | 13.8 | 2a | 2b |
| 3 | 3 | 43-46 | 10.13 / 10.12 | 54.55 / 55.17 | 2.92 / 2.95 | 72.8 | 3a | 3b |
| 4 | 4 | 52-57 | 10.06 / 9.67 | 48.94 / 48.89 | 3.85 / 3.85 | 70.2 | 4a | 4b |
| 5 | 5 | oil | 10.20 / 10.21 | 47.46 / 46.81 | 3.17 / 3.25 | 75.0 | 5a | 5b |
| 6 | 6 | oil | 9.08 / 7.78 | 47.65 / 47.99 | 2.12 / 2.27 | 33.4 | 6a | 6b |
| 7 | 7-a | 111-114 | 8.40 / 7.58 | 38.52 / 38.26 | 1.85 / 1.81 | 94.6 | 7a | 7b |
| Comparative Synthesis Example 1 | 8 | 124-126 | 14.17 / 13.77 | 50.55 / 50.05 | 3.11 / 3.29 | 74.8 | — | — |
| Comparative Synthesis Example 2 | 9 | 96-98 | 14.51 / 13.62 | 51.09 / 49.51 | 2.92 / 4.33 | 68.1 | — | — |
| Comparative Synthesis Example 3 | 10 | 80-82 | 12.55 / 11.95 | 54.79 / 54.76 | 4.61 / 4.75 | 70.6 | — | — |

Photoluminescence Intensity of Luminous Compound

The evaluation of fluorescence intensity was carried out for the luminous compounds used for the ink composition of the present invention obtained in the above-mentioned Synthesis Examples and the luminous compounds of Comparative Synthesis Examples. The evaluation was carried out by a method in which 25 mg of each of the luminous compounds was dissolved in 100 mL of chloroform or ethanol and fluorescence intensity (photoluminescence intensity PL) was measured using a fluorescence spectrometer (RF-5300 PC manufactured by Shimadzu Corporation). The above-mentioned photoluminescence intensity was shown in Table 2 below as the relative value of the photoluminescence intensity when the photoluminescence intensity of the luminous compound 8 was referred to 100.

Solubility of Luminous Compound

The solubility of each of the luminous compounds was compared. The measurement of the solubility was carried out by dissolving the luminous compounds in 100 mL of ethanol, chloroform and toluene (TL), leaving them alone at room temperature for 24 hours and then removing insoluble portion by filtration to calculate the solubility (g/100 mL of solvent). When the solubility is large, it was measured at a unit of about 5.0 g/100 mL. The result is shown in Table 2 below.

TABLE 2

| Synthesis Example | Luminous compound | $R_f$ | $L_1, L_2$ | Photoluminescence intensity (PL) EtOH | Photoluminescence intensity (PL) $CHCl_3$ | Solubility EtOH | Solubility $CHCl_3$ | Toluene (TL) |
|---|---|---|---|---|---|---|---|---|
| 1 | 1-a | $C_2F_5$ | DMSO | 113 | 122 | >50 g | >50 g | >50 g |
| 2 | 2 | $C_2F_5$ | DBSO | 115 | 122 | >50 g | >50 g | >50 g |
| 3 | 3 | $C_2F_5$ | DPSO | 116 | 120 | >50 g | >50 g | >50 g |
| 4 | 4 | $C_3F_7$ | DBSO | 109 | 117 | >50 g | >50 g | >50 g |
| 5 | 5 | $C_3F_7$ | DBSO, DMSO | 118 | 119 | >50 g | >50 g | >50 g |
| 6 | 6 | $C_5F_{11}$ | DPSO | 117 | 117 | >50 g | >50 g | >50 g |
| 7 | 7-a | $C_7F_{15}$ | DMSO | 122 | 122 | 5-10 g | >50 g | >50 g |
| Comparative Synthesis Example 1 | 8 | $CF_3$ | DMSO | 100 | 100 | 2-3 g | 3-4 g | 2-3 g |
| Comparative Synthesis Example 2 | 9 | $CF_3$ | $DMSO-d_6$ | 96 | 97 | 6-7 g | 2-3 g | <0.2 g |
| Comparative Synthesis Example 3 | 10 | $CF_3$ | DBSO | 94 | 100 | 7-8 g | >50 g | >50 g |

Table 2 shows that the luminous compounds 1-a to 7-a had increased photoluminescence intensity in comparison with the luminous compounds 8 to 10. The photoluminescence intensity was increased by using a group of $C_2$ or more as a perfluoroalkyl group, irrespective of the substituent of sulfoxide. The luminous compounds 1-a to 7-a had greatly-improved solubility for a typical solvent in comparison with the luminous compounds 8 to 10, and improved solubility for ethanol being a general ink solvent. From the viewpoint of the improvement of solubility, using the luminous compounds 1-a to 7-a makes possible to increase concentration of an ink, and the luminous compounds 1-a to 7-a can contribute to the maintenance of emission property for a long time.

FIG. 8 shows the fluorescence spectra of the luminous compounds 1-a to 7-a in Synthesis Examples 1 to 7 and those of the luminous compounds 8 to 10 of Comparative Synthesis Examples 1 to 3.

Examples 1 to 9 and Comparative Examples 1 to 3

Ink compositions containing the above-mentioned luminous compounds 1-a to 10 were prepared, the ink compositions had the ink composition I in which the ratio of ethanol:ethylene glycol:2-pyrrolidone:the luminous compound shown in Table 3 below was 90:5:4:1.

TABLE 3

| Ink composition | Ink composition I | | | | | | | | | | | |
|---|---|---|---|---|---|---|---|---|---|---|---|---|
|  | A-1 | A-2 | B | C | D | E | F | G-1 | G-2 | a | b | c |
| Luminous compound 1-a | 1 | — | — | — | — | — | — | — | — | — | — | — |
| Luminous compound 1-b | — | 1 | — | — | — | — | — | — | — | — | — | — |
| Luminous compound 2 | — | — | 1 | — | — | — | — | — | — | — | — | — |
| Luminous compound 3 | — | — | — | 1 | — | — | — | — | — | — | — | — |
| Luminous compound 4 | — | — | — | — | 1 | — | — | — | — | — | — | — |
| Luminous compound 5 | — | — | — | — | — | 1 | — | — | — | — | — | — |
| Luminous compound 6 | — | — | — | — | — | — | 1 | — | — | — | — | — |
| Luminous compound 7-a | — | — | — | — | — | — | — | 1 | — | — | — | — |
| Luminous compound 7-b | — | — | — | — | — | — | — | — | 1 | — | — | — |
| Luminous compound 8 | — | — | — | — | — | — | — | — | — | 1 | — | — |
| Luminous compound 9 | — | — | — | — | — | — | — | — | — | — | 1 | — |
| Luminous compound 10 | — | — | — | — | — | — | — | — | — | — | — | 1 |
| EtOH | 90 | 90 | 90 | 90 | 90 | 90 | 90 | 90 | 90 | 90 | 90 | 90 |
| EGL | 5 | 5 | 5 | 5 | 5 | 5 | 5 | 5 | 5 | 5 | 5 | 5 |
| 2-pyrrolidone | 4 | 4 | 4 | 4 | 4 | 4 | 4 | 4 | 4 | 4 | 4 | 4 |
| PVB | — | — | — | — | — | — | — | — | — | — | — | — |
| Ethyl acetate | — | — | — | — | — | — | — | — | — | — | — | — |
| Polyacrylate | — | — | — | — | — | — | — | — | — | — | — | — |

Example 1

The luminous compound 1-a (1.0 g) of Synthesis Example 1 was dissolved in the solution of 90 g of ethanol and 5 g of ethylene glycol, and 4.0 g of 2-pyrrolidone was added thereto to prepare an ink composition (A-1). Bar code printing was carried out on regular papers using an ink jet recorder (HG5130 manufactured by EPSON Co.). When ultraviolet rays (about 365 nm) were irradiated on the printing by a black light lamp, it emitted vivid red light.

Example 2

An ink composition (A-2) was prepared in the same manner as Example 1 except that the luminous compound 1-a in Example 1 was replaced with the luminous compound 1-b of Synthesis Example 1. Resulting ink was similarly emitted.

Example 3

An ink composition (B) was prepared in the same manner as Example 1 except that the luminous compound 1-a in Example 1 was replaced with the luminous compound 2 of Synthesis Example 2. Resulting ink was similarly emitted.

Example 4

An ink composition (C) was prepared in the same manner as Example 1 except that the luminous compound 1-a in Example 1 was replaced with the luminous compound 3 of Synthesis Example 3. Resulting ink was similarly emitted.

Example 5

An ink composition (D) was prepared in the same manner as Example 1 except that the luminous compound 1-a in Example 1 was replaced with the luminous compound 4 of Synthesis Example 4. Resulting ink was similarly emitted.

Example 6

An ink composition (E) was prepared in the same manner as Example 1 except that the luminous compound 1-a in Example 1 was replaced with the luminous compound 5 of Synthesis Example 5. Resulting ink was similarly emitted.

Example 7

An ink composition (F) was prepared in the same manner as Example 1 except that the luminous compound 1-a in Example 1 was replaced with the luminous compound 6 of Synthesis Example 6. Resulting ink was similarly emitted.

Example 8

An ink composition (G-1) was prepared in the same manner as Example 1 except that the luminous compound 1-a in Example 1 was replaced with the luminous compound 7-a of Synthesis Example 7. Resulting ink was similarly emitted.

Example 9

An ink composition (G-2) was prepared in the same manner as Example 1 except that the luminous compound 1-a in Example 1 was replaced with the luminous compound 7-b of Synthesis Example 7. Resulting ink was similarly emitted.

Comparative Example 1

An ink composition (a) was prepared in the same manner as Example 1 except that the luminous compound 1-a in Example 1 was replaced with the luminous compound 8 of Comparative Synthesis Example 1. Resulting ink was similarly emitted.

Comparative Example 2

An ink composition (b) was prepared in the same manner as Example 1 except that the luminous compound 1-a in Example 1 was replaced with the luminous compound 9 of Comparative Synthesis Example 2. Resulting ink was similarly emitted.

Comparative Example 3

An ink composition (c) was prepared in the same manner as Example 1 except that the luminous compound 1-a in Example 1 was replaced with the luminous compound 10 of Comparative Synthesis Example 3. Resulting ink was similarly emitted.

TABLE 4

Evaluation result of properties of ink composition I

| | Example | | | | | |
|---|---|---|---|---|---|---|
| | 1 | 2 | 3 | 4 | 5 | 6 |
| Ink composition | A-1 | A-2 | B | C | D | E |
| Visibility | ⊙ | ⊙ | ⊙ | ⊙ | ⊙ | ⊙ |
| Stability | ○ | ○ | ○ | ○ | ○ | ○ |
| Initial relative photoluminescence intensity (%) | | | | | | |
| Initial | 142 | 141 | 132 | 138 | 134 | 143 |
| After 5 days at 40° C. | 140 | 139 | 129 | 137 | 131 | 141 |
| Quenching rate (%) | −1.4 | −1.4 | −2.3 | −0.7 | −2.2 | −1.4 |
| Thermal stability | ○ | ○ | ○ | ○ | ○ | ○ |

TABLE 5

Evaluation result of properties of ink composition I

| | Example | | | Comparative Example | | |
|---|---|---|---|---|---|---|
| | 7 | 8 | 9 | 1 | 2 | 3 |
| Ink composition | F | G-1 | G-2 | a | b | c |
| Visibility | ⊙ | ⊙ | ⊙ | ○ | ○ | ○ |
| Stability | ○ | ○ | ○ | Δ | Δ | Δ |
| Initial relative photoluminescence intensity (%) | | | | | | |
| Initial | 121 | 142 | 141 | 100 | 97 | 92 |
| After 5 days at 40° C. | 122 | 140 | 140 | 93 | 87 | 86 |
| Quenching rate (%) | +0.8 | −1.4 | −0.7 | −7.0 | −10.3 | −6.5 |
| Thermal stability | ○ | ○ | ○ | X | X | X |

Examples 10 to 18 and Comparative Examples 4 to 6

Ink compositions containing a binder resin and the above-mentioned luminous compounds 1-a to 10 were prepared, the ink compositions had the ink composition II in which the ratio of ethanol:ethylene glycol:polyvinyl butyral:the luminous compound shown in Table 6 below was 90:5:4:1.

TABLE 6

| | Ink composition II | | | | | | | | | | | |
|---|---|---|---|---|---|---|---|---|---|---|---|---|
| Ink composition | H-1 | H-2 | I | J | K | L | M | N-1 | N-2 | d | e | f |
| Luminous compound 1-a | 1 | — | — | — | — | — | — | — | — | — | — | — |
| Luminous compound 1-b | — | 1 | — | — | — | — | — | — | — | — | — | — |
| Luminous compound 2 | — | — | 1 | — | — | — | — | — | — | — | — | — |

TABLE 6-continued

| | Ink composition II | | | | | | | | | | | |
|---|---|---|---|---|---|---|---|---|---|---|---|---|
| Ink composition | H-1 | H-2 | I | J | K | L | M | N-1 | N-2 | d | e | f |
| Luminous compound 3 | — | — | — | 1 | — | — | — | — | — | — | — | — |
| Luminous compound 4 | — | — | — | — | 1 | — | — | — | — | — | — | — |
| Luminous compound 5 | — | — | — | — | — | 1 | — | — | — | — | — | — |
| Luminous compound 6 | — | — | — | — | — | — | 1 | — | — | — | — | — |
| Luminous compound 7-a | — | — | — | — | — | — | — | 1 | — | — | — | — |
| Luminous compound 7-b | — | — | — | — | — | — | — | — | 1 | — | — | — |
| Comparative Luminous compound 8 | — | — | — | — | — | — | — | — | — | 1 | — | — |
| Comparative Luminous compound 9 | — | — | — | — | — | — | — | — | — | — | 1 | — |
| Comparative Luminous compound 10 | — | — | — | — | — | — | — | — | — | — | — | 1 |
| EtOH | 90 | 90 | 90 | 90 | 90 | 90 | 90 | 90 | 90 | 90 | 90 | 90 |
| EGL | 5 | 5 | 5 | 5 | 5 | 5 | 5 | 5 | 5 | 5 | 5 | 5 |
| 2-pyrrolidone | — | — | — | — | — | — | — | — | — | — | — | — |
| PVB | 4 | 4 | 4 | 4 | 4 | 4 | 4 | 4 | 4 | 4 | 4 | 4 |
| Ethyl acetate | — | — | — | — | — | — | — | — | — | — | — | — |
| Polyacrylate | — | — | — | — | — | — | — | — | — | — | — | — |

Example 10

The luminous compound 1-a (1.0 g) of Synthesis Example 1 was dissolved in the solution of 90 g of ethanol and 5 g of ethylene glycol, and 4.0 g of polyvinyl butyral (S-LEC BL-1 (trade name) manufactured by Sekisui Chemical Co., Ltd.) was added thereto to prepare an ink composition (H-1). Bar code printing was carried out on regular papers using an ink jet recorder (HG5130 manufactured by EPSON Co.). When ultraviolet rays (about 365 nm) were irradiated on the printing by a black light lamp, it emitted vivid red light.

Example 11

An ink composition (H-2) was prepared in the same manner as Example 10 except that the luminous compound 1-a in Example 10 was replaced with the luminous compound 1-b of Synthesis Example 1. Resulting ink was similarly emitted.

Example 12

An ink composition (I) was prepared in the same manner as Example 10 except that the luminous compound 1-a in Example 10 was replaced with the luminous compound 2 of Synthesis Example 2. Resulting ink was similarly emitted.

Example 13

An ink composition (J) was prepared in the same manner as Example 10 except that the luminous compound 1-a in Example 10 was replaced with the luminous compound 3 of Synthesis Example 3. Resulting ink was similarly emitted.

Example 14

An ink composition (K) was prepared in the same manner as Example 10 except that the luminous compound 1-a in Example 10 was replaced with the luminous compound 4 of Synthesis Example 4. Resulting ink was similarly emitted.

Example 15

An ink composition (L) was prepared in the same manner as Example 10 except that the luminous compound 1-a in Example 10 was replaced with the luminous compound 5 of Synthesis Example 5. Resulting ink was similarly emitted.

Example 16

An ink composition (M) was prepared in the same manner as Example 10 except that the luminous compound 1-a in Example 10 was replaced with the luminous compound 6 of Synthesis Example 6. Resulting ink was similarly emitted.

Example 17

An ink composition (N-1) was prepared in the same manner as Example 10 except that the luminous compound 1-a in Example 10 was replaced with the luminous compound 7-a of Synthesis Example 7. Resulting ink was similarly emitted.

Example 18

An ink composition (N-2) was prepared in the same manner as Example 10 except that the luminous compound 1-a in Example 10 was replaced with the luminous compound 7-b of Synthesis Example 7. Resulting ink was similarly emitted.

Comparative Example 4

An ink composition (d) was prepared in the same manner as Example 10 except that the luminous compound 1-a in Example 10 was replaced with the luminous compound 8 of Comparative Synthesis Example 1. Resulting ink was similarly emitted.

Comparative Example 5

An ink composition (e) was prepared in the same manner as Example 10 except that the luminous compound 1-a in Example 10 was replaced with the luminous compound 9 of Comparative Synthesis Example 2. Resulting ink was similarly emitted.

Comparative Example 6

An ink composition (f) was prepared in the same manner as Example 10 except that the luminous compound 1-a in Example 10 was replaced with the luminous compound 10 of Comparative Synthesis Example 3. Resulting ink was similarly emitted.

TABLE 7

| Evaluation result of properties of ink composition II | | | | | | |
|---|---|---|---|---|---|---|
| | Example | | | | | |
| | 10 | 11 | 12 | 13 | 14 | 15 |
| Ink composition | H-1 | H-2 | I | J | K | L |
| Visibility | ⊙ | ⊙ | ○ | ⊙ | ⊙ | ⊙ |
| Stability | ○ | ○ | ○ | ○ | ○ | ○ |
| Initial relative photoluminescence intensity (%) | | | | | | |
| Initial | 139 | 139 | 127 | 131 | 130 | 148 |
| After 5 days at 40° C. | 137 | 137 | 125 | 132 | 130 | 147 |
| Quenching rate (%) | −1.4 | −1.4 | −1.5 | +0.8 | 0 | −0.7 |

TABLE 7-continued

| Evaluation result of properties of ink composition II | | | | | | |
|---|---|---|---|---|---|---|
| | Example | | | | | |
| | 10 | 11 | 12 | 13 | 14 | 15 |
| Thermal stability | ○ | ○ | ○ | ○ | ○ | ○ |

TABLE 8

| Evaluation result of properties of ink composition II | | | | | | |
|---|---|---|---|---|---|---|
| | Example | | | Comparative Example | | |
| | 16 | 17 | 18 | 4 | 5 | 6 |
| Ink composition | M | N-1 | N-2 | d | e | f |
| Visibility | ○ | ⊙ | ⊙ | ○ | ○ | ○ |
| Stability | ○ | ○ | ○ | Δ | Δ | Δ |
| Initial relative photoluminescence intensity (%) | | | | | | |
| Initial | 118 | 142 | 141 | 100 | 98 | 91 |
| After 5 days at 40° C. | 121 | 137 | 138 | 85 | 81 | 79 |
| Quenching rate (%) | +2.5 | −3.5 | −2.1 | −15.0 | −17.3 | −13.2 |
| Thermal stability | ○ | Δ | ○ | X | X | X |

Examples 19 to 27 and Comparative Examples 7 to 9

Ink compositions containing a binder resin and the above-mentioned luminous compounds 1-a to 10 were prepared, the ink compositions had the ink composition III in which the ratio of ethanol:ethylene glycol:ethyl acetate polyacrylate: the luminous compound shown in Table 9 below was 60:5: 30:4:1.

TABLE 9

| Ink composition | Ink composition III | | | | | | | | | | | |
|---|---|---|---|---|---|---|---|---|---|---|---|---|
| | O-1 | O-2 | P | Q | R | S | T | U-1 | U-2 | g | h | i |
| Luminous compound 1-a | 1 | — | — | — | — | — | — | — | — | — | — | — |
| Luminous compound 1-b | — | 1 | — | — | — | — | — | — | — | — | — | — |
| Luminous compound 2 | — | — | 1 | — | — | — | — | — | — | — | — | — |
| Luminous compound 3 | — | — | — | 1 | — | — | — | — | — | — | — | — |
| Luminous compound 4 | — | — | — | — | 1 | — | — | — | — | — | — | — |
| Luminous compound 5 | — | — | — | — | — | 1 | — | — | — | — | — | — |
| Luminous compound 6 | — | — | — | — | — | — | 1 | — | — | — | — | — |
| Luminous compound 7-a | — | — | — | — | — | — | — | 1 | — | — | — | — |
| Luminous compound 7-b | — | — | — | — | — | — | — | — | 1 | — | — | — |
| Comparative Luminous compound 8 | — | — | — | — | — | — | — | — | — | 1 | — | — |
| Comparative Luminous compound 9 | — | — | — | — | — | — | — | — | — | — | 1 | — |

TABLE 9-continued

Ink composition III

| Ink composition | O-1 | O-2 | P | Q | R | S | T | U-1 | U-2 | g | h | i |
|---|---|---|---|---|---|---|---|---|---|---|---|---|
| Comparative Luminous compound 10 | — | — | — | — | — | — | — | — | — | — | — | 1 |
| EtOH | 60 | 60 | 60 | 60 | 60 | 60 | 60 | 60 | 60 | 60 | 60 | 60 |
| EGL | 5 | 5 | 5 | 5 | 5 | 5 | 5 | 5 | 5 | 5 | 5 | 5 |
| 2-pyrrolidone | — | — | — | — | — | — | — | — | — | — | — | — |
| PVB | — | — | — | — | — | — | — | — | — | — | — | — |
| Ethyl acetate | 30 | 30 | 30 | 30 | 30 | 30 | 30 | 30 | 30 | 30 | 30 | 30 |
| Polyacrylate | 4 | 4 | 4 | 4 | 4 | 4 | 4 | 4 | 4 | 4 | 4 | 4 |

Example 19

The luminous compound 1-a (1.0 g) of Synthesis Example 1 was dissolved in solution in which 30 g of ethyl acetate was added to the solution of 60 g of ethanol and 5 g of ethylene glycol, and 4.0 g of polyacrylate resin (NeoCRyl B-818 (trade name) manufactured by Avecia Co., Ltd.) was added thereto to prepare an ink composition (O-1). Bar code printing was carried out on regular papers using an ink jet recorder (HG5130 manufactured by EPSON Co.). When ultraviolet rays (about 365 nm) were irradiated on the printing by a black light lamp, it emitted vivid red light.

Example 20

An ink composition (O-2) was prepared in the same manner as Example 19 except that the luminous compound 1-a in Example 19 was replaced with the luminous compound 1-b of Synthesis Example 1. Resulting ink was similarly emitted.

Example 21

An ink composition (P) was prepared in the same manner as Example 19 except that the luminous compound 1-a in Example 19 was replaced with the luminous compound 2 of Synthesis Example 2. Resulting ink was similarly emitted.

Example 22

An ink composition (Q) was prepared in the same manner as Example 19 except that the luminous compound 1-a in Example 19 was replaced with the luminous compound 3 of Synthesis Example 3. Resulting ink was similarly emitted.

Example 23

An ink composition (R) was prepared in the same manner as Example 19 except that the luminous compound 1-a in Example 19 was replaced with the luminous compound 4 of Synthesis Example 4. Resulting ink was similarly emitted.

Example 24

An ink composition (S) was prepared in the same manner as Example 19 except that the luminous compound 1-a in Example 19 was replaced with the luminous compound 5 of Synthesis Example 5. Resulting ink was similarly emitted.

Example 25

An ink composition (T) was prepared in the same manner as Example 19 except that the luminous compound 1-a in Example 19 was replaced with the luminous compound 6 of Synthesis Example 6. Resulting ink was similarly emitted.

Example 26

An ink composition (U-1) was prepared in the same manner as Example 19 except that the luminous compound 1-a in Example 19 was replaced with the luminous compound 7-a of Synthesis Example 7. Resulting ink was similarly emitted.

Example 27

An ink composition (U-2) was prepared in the same manner as Example 19 except that the luminous compound 1-a in Example 19 was replaced with the luminous compound 7-b of Synthesis Example 7. Resulting ink was similarly emitted.

Comparative Example 7

An ink composition (g) was prepared in the same manner as Example 19 except that the luminous compound 1-a in Example 19 was replaced with the luminous compound 8 of Comparative Synthesis Example 1. Resulting ink was similarly emitted.

Comparative Example 8

An ink composition (h) was prepared in the same manner as Example 19 except that the luminous compound 1-a in Example 19 was replaced with the luminous compound 9 of Comparative Synthesis Example 2. Resulting ink was similarly emitted.

Comparative Example 9

An ink composition (i) was prepared in the same manner as Example 19 except that the luminous compound 1-a in Example 19 was replaced with the luminous compound 10 of Comparative Synthesis Example 3. Resulting ink was similarly emitted.

TABLE 10

Evaluation result of properties of ink composition III

| | Example | | | | | |
|---|---|---|---|---|---|---|
| | 19 | 20 | 21 | 22 | 23 | 24 |
| Ink composition | O-1 | O-2 | P | Q | R | S |
| Visibility | ○ | ○ | ○ | ○ | ○ | ○ |
| Stability | ○ | ○ | ○ | ○ | ○ | ○ |

TABLE 10-continued

Evaluation result of properties of ink composition III

| | Example | | | | | |
|---|---|---|---|---|---|---|
| | 19 | 20 | 21 | 22 | 23 | 24 |
| Initial relative photoluminescence intensity (%) | | | | | | |
| Initial | 124 | 123 | 115 | 118 | 110 | 117 |
| After 5 days at 40° C. | 136 | 136 | 126 | 128 | 121 | 127 |
| Quenching rate (%) | +9.6 | +10.6 | +9.6 | +8.5 | +10.0 | +8.5 |
| Thermal stability | ◯ | ◯ | ◯ | ◯ | ◯ | ◯ |

TABLE 11

Evaluation result of properties of ink composition III

| | Example | | | Comparative Example | | |
|---|---|---|---|---|---|---|
| | 25 | 26 | 27 | 7 | 8 | 9 |
| Ink composition | T | U-1 | U-2 | g | h | i |
| Visibility | ◯ | ◯ | ◯ | ◯ | ◯ | ◯ |
| Stability | ◯ | ◯ | ◯ | Δ | Δ | Δ |
| Initial relative photoluminescence intensity (%) | | | | | | |
| Initial | 101 | 123 | 121 | 100 | 99 | 93 |
| After 5 days at 40° C. | 107 | 133 | 132 | 104 | 101 | 97 |
| Quenching rate (%) | +5.9 | +8.1 | +9.1 | +4.0 | +2.0 | +4.3 |
| Thermal stability | ◯ | ◯ | ◯ | ◯ | ◯ | ◯ |

Evaluation of Properties

The ink compositions obtained in the above-mentioned Examples 1 to 27 and Comparative Examples 1 to 9 were tested with respect to properties below.

(1) Visibility

Visibility was evaluated by visually observing whether the bar codes printing were clearly visible or not under irradiation of ultraviolet rays. Evaluation basis is below.

Evaluation Basis

⊙: They are visible at a concentration of 0.001%.
◯: They are clearly visible at a concentration of 0.01%.
Δ: They are hardly visible at a concentration of 0.01%.

(2) Stability

The ink composition (100 g) in a transparent container was put in an incubator under control at 50° C. and preserved for 1 month. Then, stability of the ink composition preserved was evaluated by visually observing the presence or absence of precipitate. Evaluation basis is below.

Evaluation Basis

◯: Precipitate was not confirmed.
Δ: Precipitate was slightly confirmed.
×: Many precipitates were confirmed.

(3) Evaluation of Relative Photoluminescence (i) Evaluation of Initial Relative Photoluminescence Photoluminescence intensity was measured using a photoluminescence spectrometer in the same measuring procedure as the photoluminescence intensity of the above-mentioned luminous compound, in order to study photoluminescence intensity concerning each of the above-mentioned ink composition. The photoluminescence intensity of each of the ink compositions was a relative value (%) when the photoluminescence intensity at 613 nm of the ink compositions (Comparative Examples 1, 4 and 7) using the luminous compound 8 of Comparative Synthesis Example 1 was referred to 100 for each of the ink compositions I to III.

(ii) Evaluation of Thermal Stability of Relative Photoluminescence Intensity

After each of the above-mentioned ink compositions was preserved at 40° C. for 5 days under normal pressure, the photoluminescence intensity of the ink composition was measured again. The photoluminescence intensity of each of the ink compositions was a relative value (%) when the photoluminescence intensity of the ink compositions using the luminous compound 8 of Comparative Synthesis Example 1 was referred to 100 for each of the ink compositions I to III, and quenching rate (%) was determined by calculation from both values using the formula below.

$$Quenching\ rate\ (\%) = \frac{\left(\begin{array}{c} Relative\ photoluminescence\ intensity\ after\ preservation - \\ Initial\ relative\ photoluminescence\ intensity \end{array}\right)}{Initial\ relative\ photoluminescence\ intensity} \times 100$$

Quenching rate (%)=(Relative photoluminescence intensity after preservation−Initial relative photoluminescence intensity)/Initial relative photoluminescence intensity×100

The thermal stability of each of the ink compositions was evaluated using the evaluation basis below.

Evaluation Basis

◯: 3% or less
Δ: 3 to 5%
×: 5% or more

Further, the comparison of the ink relative photoluminescence intensity (%) was shown by relative intensity when initial photoluminescence intensity measured by using the luminous compound 8 of Comparative Synthesis Example 1 in each of the ink compositions I to III was referred to 100.

In the initial ink evaluation prepared according to each of Examples, these photoluminescence intensities were substantially superior in comparison with inks using any Comparative compounds of the ink compositions I to III, the photoluminescence intensities of inks in Examples were high and visibility was superior. In particular, the initial relative photoluminescence intensity was 130 or more, and evaluation result of the visibility was "⊙". Furthermore, in the stability evaluation of the initial inks, precipitate was not observed for the inks using the luminous compounds of the present invention in any ink compositions I, II and III, in contrast precipitate was observed in the Comparative compounds. Namely, it shows that the stability of the ink using the luminous compounds of the present invention was extremely superior.

The resulting inks compositions were charged in sample tubes and preserved at 40° C. in dark place for 5 days, and then, the photoluminescence intensity was measured again and quenching rate (%) was shown. The measurement result was shown by relative values when the initial prepared inks preparing the luminous compound 8 of Comparative Synthesis Example 1 of each of compositions was referred to 100. The stability of the inks composition depended on the compositions, but almost all of the evaluations for Examples were "○" and many evaluations for Comparative Examples were "×".

In comprehensive judgment, it is clear from Tables 6 to 11 that setting perfluoroalkyl chain as 2 carbons or more in the luminous composition improves luminescent brilliance, solvent solubility and resin compatibility of the ink composition containing the luminous composition. Furthermore, stability of the ink composition is also improved.

INDUSTRIAL APPLICABILITY

The ink composition of the present invention can be utilized for preparing various inks for printing used for security use provided for preventing forgery and the use of an ink composition that is provided for preparing luminescent elements containing a luminous material in the EL and LED fields.

What is claimed is:

1. An ink composition comprising a luminous compound represented by the following formula (1):

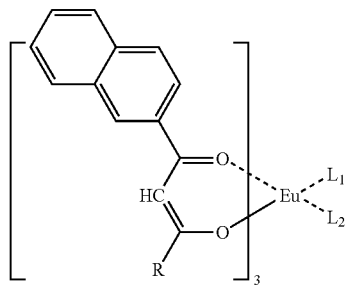

(1)

wherein R is a perfluoroalkyl group having 2 to 20 carbons, $L_1$ and $L_2$ are the same or different and are sulfoxide having a substituted or unsubstituted aryl group or a substituted or unsubstituted alkyl group.

2. The ink composition comprising the luminous compound according to claim 1, wherein R in the formula (1) is a linear perfluoroalkyl group having 2 to 10 carbons.

3. The ink composition comprising the luminous compound according to claim 1, wherein $L_1$ and $L_2$ in the formula (1) are sulfoxide having a linear or branched alkyl group or phenyl group having 1 to 10 carbons.

4. The ink composition comprising the luminous compound according to claim 1, wherein said luminous compound is manufactured by a reaction of the following components:

a first ligand indicated by the formula (2);

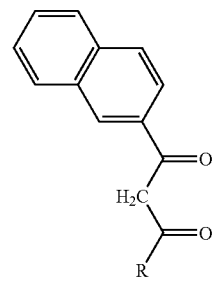

(2)

wherein R is a perfluoroalkyl group having 2 to 20 carbons, a second ligand indicated by $L_1$ and $L_2$, and a trivalent europium compound.

5. The ink composition comprising the luminous compound according to claim 1, wherein said luminous compound is produced by two steps of:

synthesizing an europium complex indicated by the formula (3)

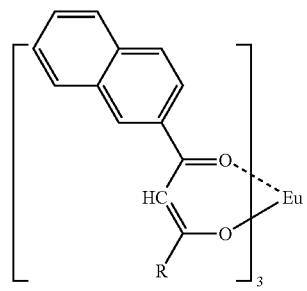

(3)

wherein R is a perfluoroalkyl group having 2 to 20 carbons from a first ligand indicated by the formula (2) and a trivalent europium compound,

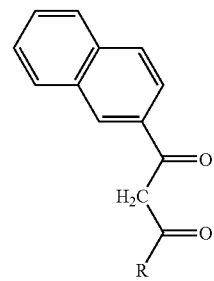

(2)

wherein R is a perfluoroalkyl group having 2 to 20 carbons, and
reacting the europium complex with a second ligand indicated by $L_1$ and $L_2$.

* * * * *